United States Patent
Wu et al.

(10) Patent No.: US 10,002,344 B2
(45) Date of Patent: Jun. 19, 2018

(54) SYSTEM AND METHOD FOR RETAIL STORE PROMOTIONAL PRICE TAG DETECTION

(71) Applicant: Conduent Business Services, LLC, Dallas, TX (US)

(72) Inventors: Wencheng Wu, Webster, NY (US); Dennis L. Venable, Marion, NY (US); Charles D. Rizzolo, Fairport, NY (US); Thomas F. Wade, Rochester, NY (US); Daniel S. Hann, Williamson, NY (US); Ethan Shen, Toronto (CA); Lee Anne Williams, Pittsford, NY (US)

(73) Assignee: Conduent Business Services, LLC, Dallax, TX (US)

( * ) Notice: Subject to any disclaimer, the term of this patent is extended or adjusted under 35 U.S.C. 154(b) by 0 days. days.

(21) Appl. No.: 15/295,498

(22) Filed: Oct. 17, 2016

(65) Prior Publication Data
US 2018/0107968 A1    Apr. 19, 2018

(51) Int. Cl.
*G06F 19/00*    (2018.01)
*G06Q 30/00*    (2012.01)
(Continued)

(52) U.S. Cl.
CPC ......... *G06Q 10/087* (2013.01); *G06K 7/1413* (2013.01); *G06K 9/4652* (2013.01);
(Continued)

(58) Field of Classification Search
CPC ......... G06F 19/00; G06F 17/00; G06Q 30/00; G06Q 90/00; G06Q 10/00; G06Q 20/00; G06K 19/00; G06G 1/14
(Continued)

(56) References Cited

U.S. PATENT DOCUMENTS

| 5,512,739 A | 4/1996 | Chandler et al. |
| 6,473,122 B1 | 10/2002 | Kanekal |

(Continued)

FOREIGN PATENT DOCUMENTS

| WO | WO 2007/117368 A2 | 10/2007 |
| WO | WO 2009/094031 A1 | 7/2009 |

OTHER PUBLICATIONS

U.S. Appl. No. 15/295,634, filed Oct. 17, 2016, Venable et al.
(Continued)

*Primary Examiner* — Edwyn Labaze
(74) *Attorney, Agent, or Firm* — Fay Sharpe LLP

(57) ABSTRACT

A system to detect and maintain retail store promotional price tags (PPTs) includes a heuristic PPT description extractor module, a heuristic rule deriver module, a store shelf image acquisition system, a barcode locator and recognizer module, and a heuristic PPT classifier module. The heuristic PPT description extractor module extracts heuristic descriptions of PPTs. The heuristic rule deriver module derives a set of heuristic parameters for the PPTs. The barcode locator and recognizer module analyzes images acquired by the store shelf image acquisition system to localize and recognize barcodes. The heuristic PPT description classifier module extracts heuristic attributes from the images acquired by the store shelf image acquisition system using the set of PPT parameters supplied by the heuristic rule deriver module.

21 Claims, 17 Drawing Sheets
(2 of 17 Drawing Sheet(s) Filed in Color)

(51) Int. Cl.

| | | |
|---|---|---|
| *G06Q 90/00* | (2006.01) | |
| *G06Q 10/08* | (2012.01) | |
| *H04N 1/60* | (2006.01) | |
| *G06K 9/46* | (2006.01) | |
| *G06T 11/60* | (2006.01) | |
| *G06K 19/077* | (2006.01) | |
| *G06K 19/06* | (2006.01) | |
| *G06K 7/14* | (2006.01) | |

(52) U.S. Cl.
CPC . *G06K 19/06028* (2013.01); *G06K 19/07758* (2013.01); *G06T 11/60* (2013.01); *H04N 1/6002* (2013.01)

(58) Field of Classification Search
USPC .................. 235/385, 375, 487; 705/22, 28
See application file for complete search history.

(56) References Cited

U.S. PATENT DOCUMENTS

| | | |
|---|---|---|
| 6,814,290 B2 | 11/2004 | Longacre |
| 7,066,291 B2 | 6/2006 | Martins et al. |
| 7,290,707 B2 | 11/2007 | Sawasaki |
| 7,386,163 B2 | 6/2008 | Sabe et al. |
| 7,574,378 B2 | 8/2009 | Lipowitz et al. |
| 7,693,757 B2 | 4/2010 | Zimmerman |
| 8,189,855 B2 | 5/2012 | Opalach et al. |
| 8,296,259 B1 | 10/2012 | Trandal et al. |
| 8,326,069 B2 | 12/2012 | Maslov et al. |
| 8,429,004 B2 | 4/2013 | Hamilton et al. |
| 9,015,072 B2 | 4/2015 | Wu et al. |
| 2002/0141640 A1 | 10/2002 | Kraft |
| 2002/0165790 A1 | 11/2002 | Bancroft et al. |
| 2002/0196979 A1 | 12/2002 | Yen et al. |
| 2003/0154141 A1 | 8/2003 | Capazario et al. |
| 2003/0179931 A1 | 9/2003 | Sun |
| 2004/0013295 A1 | 1/2004 | Sabe et al. |
| 2004/0233278 A1 | 11/2004 | Prudhomme et al. |
| 2005/0218218 A1* | 10/2005 | Koster .................. G06F 3/147 235/383 |
| 2006/0072176 A1 | 4/2006 | Silverstein et al. |
| 2006/0202032 A1 | 9/2006 | Kricorissian |
| 2008/0010169 A1* | 1/2008 | Dollens ............... G06Q 30/0603 705/27.2 |
| 2008/0077511 A1 | 3/2008 | Zimmerman |
| 2008/0306787 A1 | 12/2008 | Hamilton et al. |
| 2009/0020601 A1* | 1/2009 | Woodbury ........... G06Q 10/087 235/375 |
| 2009/0059270 A1 | 3/2009 | Opalach et al. |
| 2009/0212113 A1 | 8/2009 | Chiu et al. |
| 2010/0070365 A1 | 3/2010 | Siotia et al. |
| 2010/0171826 A1 | 7/2010 | Hamilton et al. |
| 2010/0287057 A1* | 11/2010 | Aihara ................. G06K 7/1095 705/16 |
| 2013/0030915 A1 | 1/2013 | Statler et al. |
| 2013/0103608 A1 | 4/2013 | Scipioni et al. |
| 2013/0193211 A1 | 8/2013 | Baqai et al. |
| 2013/0229517 A1 | 9/2013 | Kozitsky et al. |
| 2013/0278761 A1 | 10/2013 | Wu |
| 2013/0300729 A1 | 11/2013 | Grimaud |
| 2013/0342706 A1 | 12/2013 | Hoover et al. |
| 2014/0003727 A1 | 1/2014 | Lortz et al. |
| 2014/0139548 A1* | 5/2014 | Byers ..................... G06F 3/1431 345/619 |
| 2014/0218553 A1 | 8/2014 | Deever |
| 2014/0304107 A1 | 10/2014 | Clarke William McAllister |
| 2014/0330637 A1* | 11/2014 | Moran ............... G06Q 30/0244 705/14.43 |
| 2014/0363625 A1 | 12/2014 | Huang et al. |
| 2015/0046299 A1 | 2/2015 | Yan |
| 2015/0363625 A1 | 12/2015 | Wu et al. |
| 2015/0363758 A1 | 12/2015 | Wu et al. |
| 2015/0365660 A1 | 12/2015 | Wu et al. |
| 2015/0365669 A1 | 12/2015 | Wu et al. |
| 2016/0110633 A1 | 4/2016 | Moore et al. |
| 2016/0134930 A1* | 5/2016 | Swafford .............. A47F 5/0068 725/80 |
| 2016/0260051 A1 | 9/2016 | Wu et al. |

OTHER PUBLICATIONS

U.S. Appl. No. 15/295,306, filed Oct. 17, 2016, Rizzolo et al.
U.S. Appl. No. 15/295,031, filed Oct. 17, 2016, Rizzolo et al.
U.S. Appl. No. 15/294,937, filed Oct. 17, 2016, Venable et al.
U.S. Appl. No. 14/521,996, filed Oct. 23, 2014, Wencheng Wu.
U.S. Appl. No. 14/637,830, filed Mar. 4, 2015, Wu et al.
U.S. Appl. No. 14/643,721, filed Mar. 10, 2015, Wu et al.
U.S. Appl. No. 15/066,392, filed Mar. 10, 2016, Venable et al.
Adelmann et al., "Toolkit for Bar Code Recognition and Resolving on Camera Phones—Jump-Starting the Internet of Things", Informatik Workshop on Mobile and Embedded Interactive Systems, pp. 1-7 (2006).
Bailey, "Super-Resolution of Bar Codes", Journal of Electronic Imaging, vol. 10, No. 1, pp. 213-220 (2001).
Ballard, "Generalizing the Hough Transform to Detect Arbitrary Shapes", Pattern Recognition, vol. 13, No. 2, pp. 111-122 (1981).
Bodnár et al., "Barcode Detection With Uniform Partitioning and Morphological Operations", Conf. of PhD Students in Computer Science, pp. 4-5 (2012).
Bodnár et al., "Improving Barcode Detection With Combination of Simple Detectors", Int'l Conf. on Signal Image Technology and Internet Based Systems, pp. 300-306 (2012).
Canny, "A Computational Approach to Edge Detection", IEEE Transactions on Pattern Analysis and Machine Intelligence, vol. PAMI-8, No. 6, pp. 679-698 (1986).
Ebner et al., "Development and Testing of a Color Space (IPT) With Improved Hue Uniformity", Proceedings of IS&T/SID's Sixth Color Imaging Conf., pp. 8-13 (1998).
Felzenszwalb et al., "Distance Transforms of Sampled Functions", Cornell Computing and Information Science, Tech. Rep., pp. 1-15 (2004).
Gonzalez et al., "Digital Image Processing", $3^{rd}$ Edition, Prentice Hall, pp. 1-22 (2008).
Hodges, "An Introduction to Video and Audio Measurement", Elsevier, p. 173-185 (2004).
Hunt, "The Reproduction of Colour", John Wiley & Sons, p. 48 (2004).
Jain et al., "Bar Code Localization Using Texture Analysis", Proceedings of the Second Int'l Conf. on Document Analysis and Recognition, pp. 41-44 (1993).
Joseph et al., "Bar Code Waveform Recognition Using Peak Locations", IEEE Transactions on Pattern Analysis and Machine Intelligence, vol. 16, No. 6, pp. 630-640 (1994).
Juett, "Barcode Localization Using a Bottom Hat Filter", NSF Research Experience for Undergraduates, pp. 1-26 (2005).
Katona et al., "A Novel Method for Accurate and Efficient Barcode Detection With Morphological Operations", Eighth Int'l Conf. on Signal Image Technology and Internet Based Systems, pp. 307-314 (2012).
Kiryati et al., "A Probabilistic Hough Transform", Pattern Recognition, vol. 24, No. 4, pp. 303-316 (1991).
Kuroki et al., "Bar Code Recognition System Using Image Processing", Hitachi Process Computer Engineering, Inc., pp. 568-572 (1990).
Lin et al., "Multi-Symbology and Multiple 1D/2D Barcodes Extraction Framework", Advances in Multimedia Modeling, pp. 401-410 (2011).
Lin et al., "Real-Time Automatic Recognition of Omnidirectional Multiple Barcodes and DSP Implementation", Machine Vision and Applications, vol. 22, pp. 409-419 (2011).
Liyanage, "Efficient Decoding of Blurred, Pitched, and Scratched Barcode Images", Second Int'l Conf. on Industrial and Information Systems, pp. 1-6 (2007).
McKesson, "Linearity and Gamma—Chapter 12—Dynamic Range", arcsynthesis.org, pp. 1-7 (retrieved Jul. 11, 2013).

(56) References Cited

OTHER PUBLICATIONS

Muniz et al., "A Robust Software Barcode Reader Using the Hough Transform", Int'l Conf. on Information Intelligence and Systems, pp. 313-319 (1999).
Normand et al., "A Two-Dimensional Bar Code Reader", 12$^{th}$ Int'l Conf. on Pattern Recognition, vol. 3, pp. 201-203 (1994).
Ohbuchi et al., "Barcode Readers Using the Camera Device in Mobile Phones", Proceedings of the 2004 Int'l Conf. on Cyberworlds, pp. 1-6 (2004).
Oktem et al., "A Superesolution Approach for Bar Code Reading", Electrical and Engineering Department, Atilim University, Turkey, pp. 1-4 (2002).
Oktem, "Bar Code Localization in Wavelet Domain by Using Binary", Proceedings of the IEEE 12$^{th}$ Signal Processing and Communications Applications Conference, pp. 499-501 (2004).
Pavlidis et al., "Fundamentals of Bar Code Information Theory", IEEE Transactions on Pattern Analysis and Machine Intelligence, vol. 16, No. 6, pp. 630-640 (1994).
Poynton, "Digital Video and HDTV: Algorithms and Interfaces" Morgan Kaufman Publishers, pp. 260 and 630 (2003).
Poynton, "Frequently Questioned Answers About Gamma", poynton.com, pp. 1-3 (2010).
Reinhard et al., "High Dynamic Range Imaging: Acquisition, Display, and Image-Based Lighting", Morgan Kaufmann Publishers, p. 82 (2010).
Tuinstra, "Reading Barcodes From Digital Imagery", Ph.D. dissertation, Cedarville University, pp. 1-18 (2006).
Wittman et al., "Super-Resolution of 1D Barcode Images", University of Minnesota, pp. 1-41 (2004).
Wu et al., "Automatic Thresholding of Gray-Level Using Multi-Stage Approach", Proceedings of the Seventh Int'l Conf. on Document Analysis and Recognition, pp. 493-497 (2003).
Youssef et al., "Automated Barcode Recognition for Smart Identification and Inspection Automation", Expert Systems with Applications, vol. 33, No. 4, pp. 968-977 (2007).
Zhang, "Flexible Camera Calibration by Viewing a Plane From Unknown Orientations", Int'l Conf. on Computer Vision, Corfu, Greece, pp. 666-673 (1999).
Husky et al., "Unmanned Ground Vehicle, Clearpath Robotics," pp. 1-2 (2013).
The Hague, Nov. 27, 2017, Extended European Search Report for Application No. EP 17 19 6769, 8 pages.

\* cited by examiner

SYSTEM AND METHOD FOR RETAIL STORE PROMOTIONAL PRICE TAG DETECTION

CROSS REFERENCE TO RELATED PATENTS AND APPLICATIONS

U.S. application Ser. No. 14/637,830, filed Mar. 4, 2015, now U.S. Publication No. 2016/0260051, published Sep. 8, 2016, by Wu et al., and entitled "SYSTEM AND METHOD FOR RETAIL STORE PROMOTIONAL PRICE TAG DETECTION AND MAINTENANCE VIA HEURISTIC CLASSIFIERS", is incorporated herein by reference in its entirety.

BACKGROUND

This disclosure relates generally to systems and methods for maintaining the displayed pricing of retail inventory. More particularly, the present disclosure relates to systems and methods for maintaining promotional price tags/signage in a retail store.

There are a large number of retail chains worldwide across various market segments, including pharmacy, grocery, home improvement, and others. One practice that many such chains have in common is sale advertising and merchandising. An element of this practice is the printing and posting of sale item signage within each store, very often at a weekly cadence.

Managed print services vendors providing this weekly signage have an interest in supplying the signage to all stores within a chain. It would be advantageous to each store if this signage was printed and packed in the order in which an employee posts the signs on the shelves (which is also the order in which a person encounters sale products while walking down each aisle). Doing so eliminates a non-value-add step of manually having to pre-sort the signage into the specific order appropriate for a given store.

Unfortunately, with few exceptions, retail chains cannot control or predict the product locations across each of their stores. This may be due to a number of factors: store manager discretion, local product merchandising campaigns, different store sizes and layouts, etc. Thus it would be advantageous to a retail chain to be able to collect product location data (referred to as a store profile) automatically across its stores, since each store could then receive signage in an appropriate order to avoid a pre-sorting step.

The system described herein detects and recognizes various promotional price tags/signage in a retail store. It may be used to improve the retail store management: resource and efficiency, by auditing missing or out-of-date promotional price tags/signage and informing staff where they are located.

INCORPORATION BY REFERENCE

U.S. Pat. No. 8,429,004, issued Apr. 23, 2013, by Hamilton et al., and entitled "METHOD AND SYSTEM FOR AUTOMATICALLY MEASURING RETAIL STORE DISPLAY COMPLIANCE";

U.S. Patent Publication No. 2015/0363625, published Dec. 17, 2015, by Wu et al., and entitled "IMAGE PROCESSING METHODS AND SYSTEMS FOR BARCODE AND/OR PRODUCT LABEL RECOGNITION";

U.S. Patent Publication No. 2015/0363758, Published Dec. 17, 2015, by Wu et al., and entitled "STORE SHELF IMAGING SYSTEM";

U.S. Patent Publication No. 2015/0365660, published Dec. 17, 2015, by Wu et al., and entitled "METHOD AND SYSTEM FOR SPATIAL CHARACTERIZATION OF AN IMAGING SYSTEM";

U.S. Patent Publication No. 2016/0110633, published Apr. 21, 2016, by Moore et al., and entitled "ON-DEMAND SHELF SIGNAGE PRINTING";

U.S. Patent Publication No. 2016/0119540, published Apr. 28, 2016, by Wencheng Wu, and entitled, "MODEL-BASED PLANE-LIKE PANORAMA AND RETAIL APPLICATIONS";

U.S. Patent Publication No. 2016/0260051, published Sep. 8, 2016, by Wu et al., and entitled "SYSTEM AND METHOD FOR RETAIL STORE PROMOTIONAL PRICE TAG DETECTION AND MAINTENANCE VIA HEURISTIC CLASSIFIERS";

U.S. Patent Publication No. 2016/0267304, published Sep. 15, 2016, by Wu et al., and entitled "PRINTED TAG INFORMATION RECOGNITION USING MULTI-POSE ILLUMINATION TO MITIGATE GLARE";

U.S. patent application Ser. No. 15/066,392, filed Mar. 10, 2016, by Venable et al., and entitled "SYSTEMS AND METHODS FOR ROBOT MOTION CONTROL AND IMPROVED POSITIONAL ACCURACY";

U.S. patent application Ser. No. 15/066,507, filed Mar. 10, 2016, by Wu et al., and entitled "HIGH ACCURACY LOCALIZATION SYSTEM AND METHOD FOR RETAIL STORE PROFILING VIA PRODUCT IMAGE RECOGNITION AND ITS CORRESPONDING DIMENSION DATABASE";

U.S. patent application Ser. No. 15/294,937, filed Oct. 17, 2016, by Venable et al., and entitled "STORE SHELF IMAGING SYSTEM AND METHOD";

U.S. patent application Ser. No. 15/295,031, filed Oct. 17, 2016, by Rizzolo et al., and entitled "STORE SHELF IMAGING SYSTEM AND METHOD";

U.S. patent application Ser. No. 15/295,306, filed Oct. 17, 2016, by Rizzolo et al., and entitled "STORE SHELF IMAGING SYSTEM AND METHOD"; and U.S. patent application Ser. No. 15/295,634, filed Oct. 17, 2016, by Venable et al., and entitled "STORE SHELF IMAGING SYSTEM AND METHOD USING A VERTICAL LIDAR", are incorporated herein by reference in their entirety.

BRIEF DESCRIPTION

In one embodiment of this disclosure, described is a retail store promotional price tag (PPT) detection and classification system comprising: a store shelf image acquisition module configured to acquire images of a plurality of product display units located in a retail store, the plurality of product display units including a plurality of products arranged on one or more of the product display fixtures, and a plurality of PPTs attached to the product display fixtures, each PPT including one or more printed colors and product-related data including a barcode associated with a respective product proximately located on the product display fixture near the PPT; a device characterization module configured to generate one or more color profiles associated with transforming a plurality of colors associated with the acquired image of the printed PPTs from an image acquisition color space to an original color space associated with a digital representation of the PPTs; and a PPT detection and classifier module configured to extract one or more heuristic attributes including color from the acquired images using the one or more color profiles and apply one or more predefined heuristic rules to the heuristic attributes to detect and classify each PPT detected in the acquired images as one of a plurality of PPT types.

In another embodiment of this disclosure, a retail store promotional price tag (PPT) detection and classification system comprising: a store shelf image acquisition model configured to acquire images from a plurality of image capture devices of a plurality of product display units located in a retail store, the plurality of product display units including a plurality of products arranged on one or more of the product display fixtures, and a plurality of printed PPTs attached to the product display fixtures, each PPT including product-related data including a barcode associated with a respective product proximately located on the product display fixture near the PPT; a device characterization module configured to generate one or more spatial profiles associated with transforming the acquired images to compensate for distortions associated with each image capture device and alignment of the acquired images; an image stitching module configured to access the one or more spatial profiles and stitch the acquired images to generate a panorama image; and a PPT detection and classifier module configured to extract one or more heuristic attributes from the panorama image and apply one or more predefined heuristic rules to the heuristic attributes to detect and classify each PPT detected as one of a plurality of PPT types.

In still another embodiment of this disclosure, described is a retail store profile generation system comprising: a mobile base including an operatively associated navigation component configured to determine a location of the mobile base within a retail store, the retail store including a plurality of product display units arranged in a plurality of aisles, each product display unit including a plurality of product display fixtures, a plurality of product arranged on one or more of the product display fixtures, and a plurality of tags attached to the product display fixtures, each tag including product-related data including a barcode associated with a respective product proximately located on the product display fixture near the tag; an image capture assembly mounted on the mobile base, the assembly including a plurality of vertically spaced image capture devices for acquiring images of the product display units; a master control unit including an operatively associated memory which stores instructions and a processor for executing the instructions, the control unit instructions including instructions for processing the images acquired by the plurality of image capture devices at a sequence of locations during a movement of the mobile base in the store, thereafter extracting the product-related data from the images of the product display units and generating a store profile indicating locations of the products and/or tags throughout the store based on the extracted product-related data, a spatial characterization of the image capture assembly, a color characterization associated with transforming a plurality of colors associated with the acquired images from an image acquisition color space to an original color space associated with a digital representation of the tags, and the locations of the mobile base at the sequence of locations provided by the navigation component during an interval of time that the images were acquired.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 6 illustrates examples of a color and intensity shift associated with an imaging system resulting from a transition from a digital color space to printing to imaging, where

DETAILED DESCRIPTION

Figure 1:
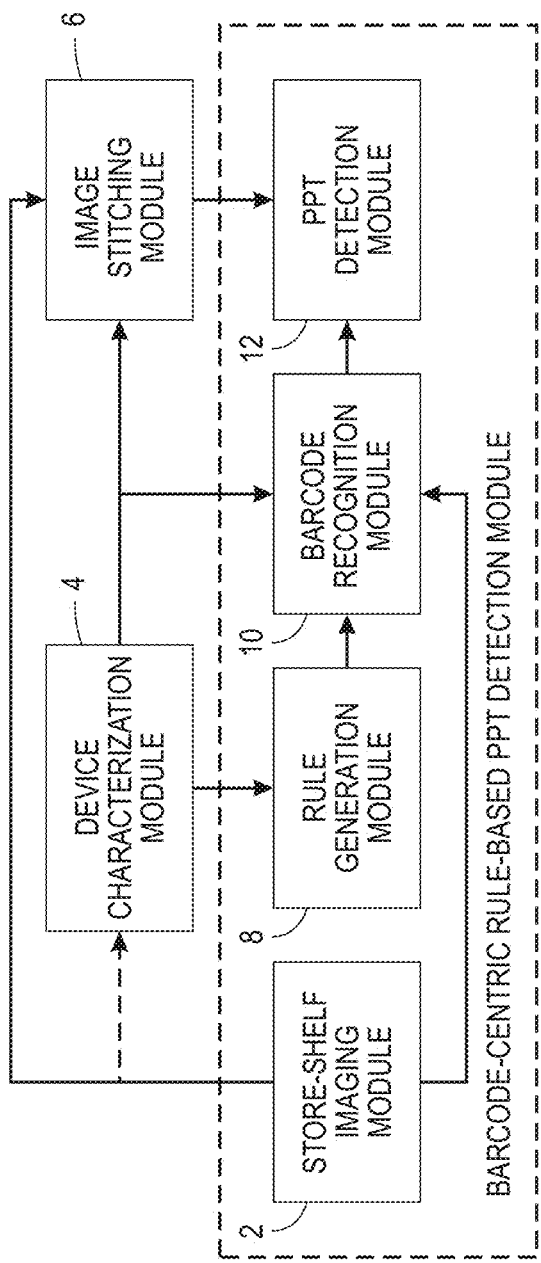
FIG. 1 is a block diagram of a barcode-centric heuristic rule based PPT detection module according to an exemplary embodiment of this disclosure.

With reference to the drawings wherein like numerals represent like parts throughout the several figures, a system for retail store promotional price tag detection and maintenance via heuristic classifiers in accordance with the present disclosure is generally designated by the numeral 10. The system utilizes image-based and/or video-based analytics to detect promotional price tags/signage (PPTs). Promotional price tags are hereby defined to be signage designed to be human-read, used to temporarily promote the sale of an item and containing at least one of the following: a barcode (any machine-readable image with a relatively high accuracy rate compared to optical character recognition), a color patch, a number (e.g. price), and text. See FIG. 16. PPTs are generally used by retail stores selling to the public to attract the buyers' attention to specific goods that are the subject of promotional marketing. However, "retail store" is hereby defined to include any retail or wholesale location utilizing PPTs. This information may be used to improve the retail store management: resource and efficiency, by checking invalid PPTs (e.g. missing or out-of-date PPTs) and providing the location of any such PPTs. The matching or detection required for this system must be accomplished using higher level attributes since there are both static and variable elements in the PPTs.

This disclosure provides a system and method for an automated retail store promotional price tag (PPT) detection via device characterization and image stitching. The disclosed system and method addresses two issues that may adversely affect a PPT detection rate: Cut-Offs and False Positives. "Cut-off" issues occur when a PPT is not fully imaged by one camera (i.e., split between two cameras-either vertically or horizontally). "High False Positives" are caused by color shifts in the digital PPT template and the colors in the acquired camera images as well as the presence of "colorful" packaging in a shelf product. The two "issues" are addressed in the "Device Characterization Module" of the disclosed system and method. Cut-off issues are solved by model-based image stitching on the acquired images plus appropriate morphological filtering that is used to deal with the imperfections of stitching. False Positives are addressed by either incorporating color workflow, concatenating color profiles of the printing and imaging system, or by generating sparse color tables to address the critical colors in PPT. Benefits of the disclosed system and method include an improved success rate of PPT detection.

Furthermore, the present disclosure teaches an improved system for retail store promotional price tag (PPT) detection via device characterization and image stitching. Specifically, the disclosed system and method improves upon previous barcode-centric rule-based PPT detection systems, such as those disclosed in U.S. Publication No. 2016/0260051, published Sep. 8, 2016, by Wu et al., and entitled "SYSTEM AND METHOD FOR RETAIL STORE PROMOTIONAL PRICE TAG DETECTION AND MAINTENANCE VIA HEURISTIC CLASSIFIERS", by incorporating additional information and processing via device characterization and image stitching. An exemplary embodiment of the system includes (1) a store-shelf imaging module, which acquires shelf images for barcode localization and recognition and for image stitching; (2) a device characterization module, which characterizes the individual and combined interaction among relevant devices such as digital template to printing device, print to imaging device etc. and feeds the information to the PPT detection module and image stitching module; (3) an image stitching module, which performs model-based image stitching (see U.S. Patent Publication No. 2016/0119540, published Apr. 28, 2016, by Wencheng Wu, and entitled, "MODEL-BASED PLANE-LIKE PANORAMA AND RETAIL APPLICATIONS") to build panorama images of the store shelf; (4) a rule generation module, which generates rules and useful parameters to be used by PPT detection module; (5) a barcode localization and recognition modules, which analyzes full or portion of acquired non-stitched images to localize and recognize barcodes; and (6) a promotional price tag detection module, which performs promotional price tag detection on stitched images using a method derived from U.S. Publication No. 2016/0260051, published Sep. 8, 2016, by Wu et al., and entitled "SYSTEM AND METHOD FOR RETAIL STORE PROMOTIONAL PRICE TAG DETECTION AND MAINTENANCE VIA HEURISTIC CLASSIFIERS" and the one or more rules generated by the rule generation module.

According to an exemplary embodiment of this disclosure, a complete retail store profile system is provided including various image-based and video-based analytics for (1) determining the spatial layout of products in a retail store, i.e., store profile, via barcode recognition of and (2) detecting and recognizing various promotional price tags/signage (PPTs) in the retail store. The exemplary system and method improves PPT detection when not enough image features of the PPT are captured and available in one image for PPT detection, which is especially an issue for relatively large PPTs. Largest PPTs increase the chance of cut-off. In addition, reduced overlap regions between cameras to cover the shelf-height also increases the chance of cut-off. The high false-positive failure mode is caused by two factors as well, first there are color shifts between the colors in the digital PPT template and the colors in the acquired camera images. This can result in incorrect color rules (thresholds) when applying previous PPT detection methods. To accommodate unknown color shifts, previous systems and methods set rules very loosely to have higher PPT detection rate, which inevitably increases the false-positive rate. Second, high false-positives can result from "colorful" packaging on the shelf-product. The disclosed system and method, and the exemplary embodiments described herein, provides a solution to reduce cut-off and reduce false-positives by "understanding" the color shifts so that color rules can be tightened and the system is better able to process "colorful" packaging backgrounds for PPT detection.

With reference to FIG. 1, shown is a block diagram of a barcode-centric heuristic rule based PPT detection module according to an exemplary embodiment of this disclosure, the system including:

A store-shelf imaging module 2, which acquires shelf images for barcode localization and recognition and for image stitching; [on-line process]

A device characterization module 4, which characterizes the individual and combined interaction among relevant devices such as digital template to printing device, print to imaging device etc. and feeds the information to the PPT detection module and image stitching module; [off-line process]

An image stitching module 6, which performs model-based image stitching to build panorama images of the store shelf (see U.S. patent application Ser. No. 14/521,996, filed Oct. 23, 2014, by Wencheng Wu, and entitled, "MODEL-BASED PLANE-LIKE PANORAMA AND RETAIL APPLICATIONS"); [on-line process]

A rule generation module 8, which generates rules and useful parameters to be used by PPT detection module; [off-line process]

A barcode localization and recognition module 10, which analyzes full or portion of acquired non-stitched images to localize and recognize barcodes; [on-line process] and A promotional price tag detection module 12, which performs promotional price tag detection on stitched images similar to PPT detection as disclosed in U.S. Publication No. 2016/0260051, published Sep. 8, 2016, by Wu et al., and entitled "SYSTEM AND METHOD FOR RETAIL STORE PROMOTIONAL PRICE TAG DETECTION AND MAIN- TENANCE VIA HEURISTIC CLASSIFIERS" and the rules generated [on-line process] in the rule generation module.

With reference to FIGS. 2-5, shown and described is a mobile profile generation system 14 incorporating a PPT detection system as described herein, the mobile profile generation system configured for determining a spatial layout 13 of the product content of a product facility, such as a retail store, warehouse, or the like. The spatial layout may be referred to herein as a store profile. The store profile 13 may be in the form of a 2-dimensional or 3-dimensional plan of the store which indicates the locations of products, for example, by providing product data for each product, such as an SKU or barcode, and an associated location, such as x,y coordinates (where x is generally a direction parallel to an aisle and y is orthogonal to it), a position on an aisle, or a position on a predefined path, such as a walking path through the store. In some embodiments, the store profile may include a photographic panorama of a part of the store generated from a set of captured images, or a graphical representation generated therefrom.

Figure 2:
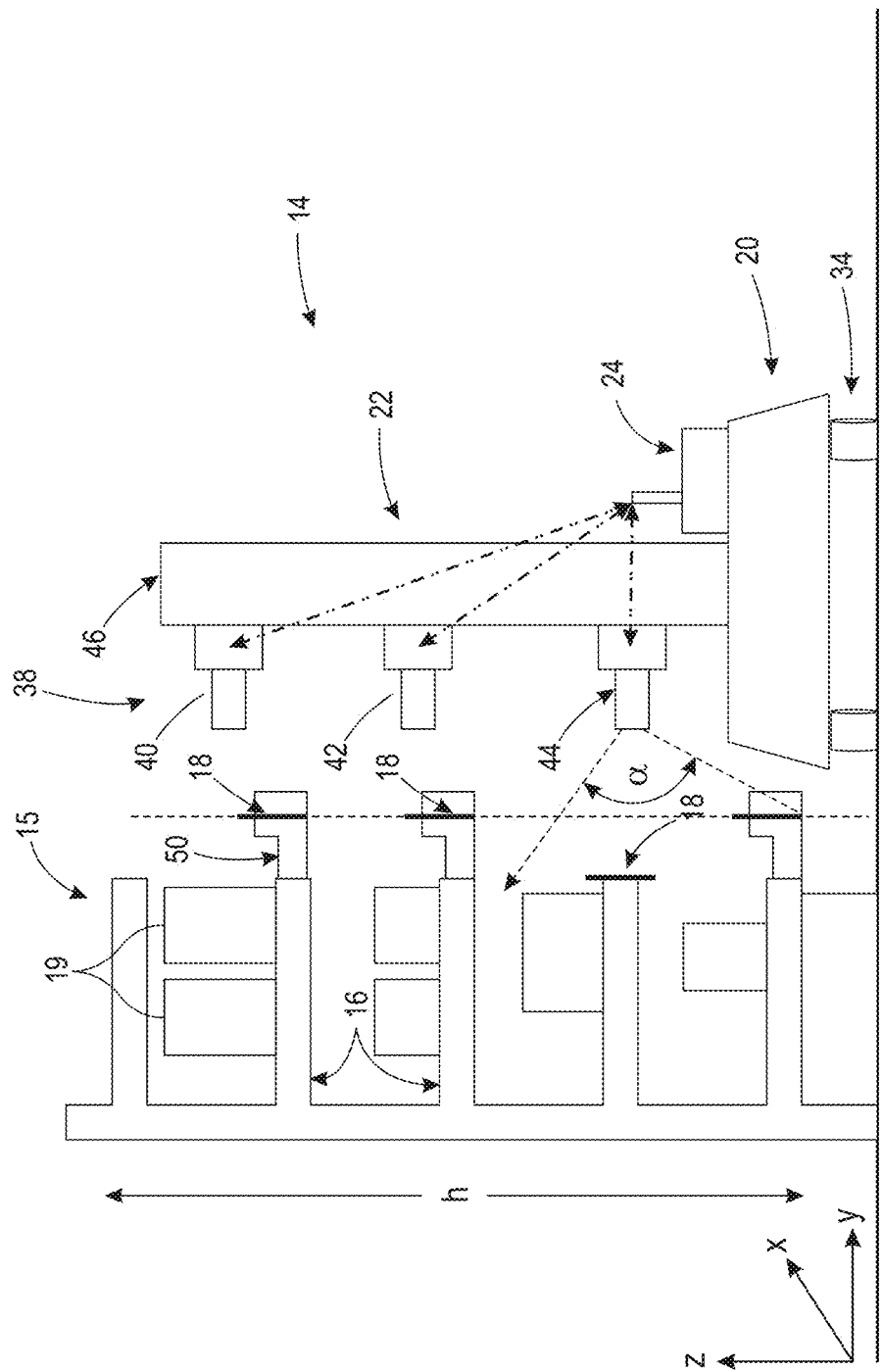
FIG. 2 is a schematic elevational view of a store profile generation system in accordance with one aspect of an exemplary embodiment of this disclosure.

The store profile 13 is generated by capturing images of product display units 15, such as store shelf units, at appropriate locations with appropriate imaging resolutions. As illustrated in FIG. 2, each shelf unit 15 may include two or more vertically-spaced shelves 16, to which product labels 18, such as product price tags, displaying product-related information, are mounted, adjacent related products 19. In the exemplary embodiments, the price labels are not on the products themselves, but on the shelf units, e.g., in determined locations. Thus for example, a portion of a shelf which is allocated to a given product may provide for one (or more) price labels to be displayed for that product. In other embodiments the product labels 18 may be displayed on an adjacent pegboard or be otherwise associated with the respective display unit 15.

The exemplary profile generation system 14 includes a mobile base 20, an image capture assembly 22, and a control unit 24, which are moveable as a unit around the product facility. The exemplary system 14 captures images within a product facility, such as a retail store, with the image capture assembly 22 at a sequence of locations of the mobile base 20, extracts product-related data 26 (e.g., printed barcodes and/or text from the captured product price labels) and location information from the images and the mobile base location, and constructs a store profile 13 (e.g., a 2D map, as discussed above) which defines a spatial layout of locations of the shelf labels 18 within the store.

Figure 3:
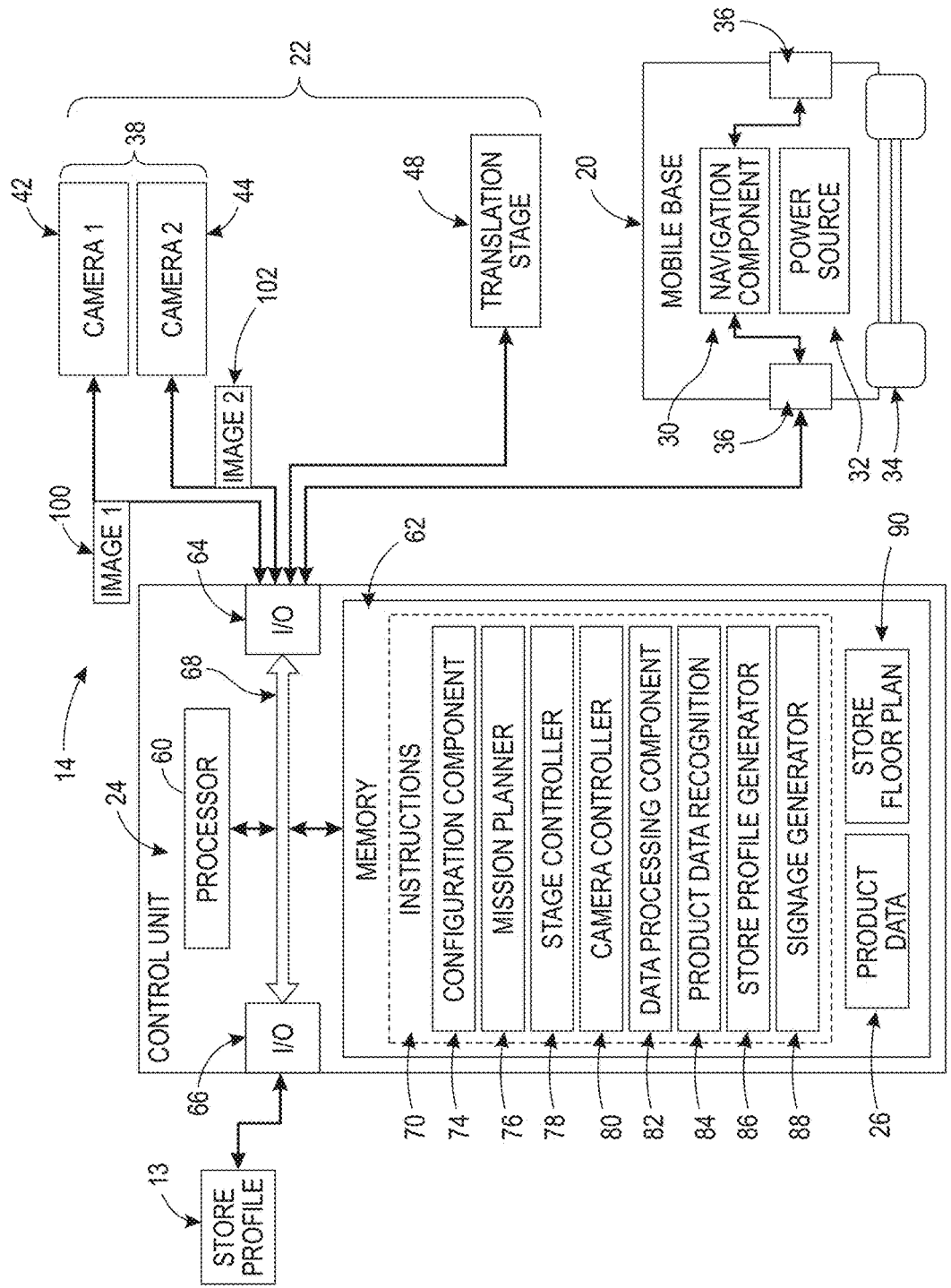
FIG. 3 is a functional block diagram of the store profile generation system of FIG. 2 in accordance with one aspect of an exemplary embodiment of this disclosure.

The mobile base 20 serves to transport the image capture assembly 22 around the product facility and may be fully-autonomous or semi-autonomous. In one embodiment, the mobile base 20 is responsible for navigating the system 14 to a desired location with desired facing (orientation), as requested by the control unit 24, and reporting back the actual location and facing, if there is any deviation from the request. As illustrated in FIG. 3, in a fully-autonomous mode, the motorized mobile base 20 may include a navigation component 30 and an associated power source 32, such as a battery, motor, drive train, etc., to drive wheels 34 of the of the mobile base in order to move the system 14 to a desired location with desired facing according to a request from the control unit 24. The navigation component 30 may be similarly configured to the control unit 24 and may include memory and a processor for implementing the instructions provided by the control unit and reporting location and orientation information back to the control unit. Position and/or motion sensors 36 provide the navigation component 30 with sensing capability to confirm and/or measure any deviation from the requested location and orientation. These may be used by the navigation component for identifying the location, orientation, and movement of the mobile base for navigation and for store profile generation by the control unit. One suitable mobile base which can be adapted to use herein is a Husky™ unmanned ground vehicle obtainable from Clearpath Robotics Inc., 148 Manitou Dr., Kitchener, Ontario N2C 1L3, Canada, which includes a battery-powered power source.

In a semi-autonomous mode, the mobile base 20 is pushed by a person (e.g., as a cart), and thus the power source and optionally also the navigation component may be omitted. In some embodiments, the navigation component and sensors may be used in the semi-automated mode to confirm and/or measure any deviation from a requested location and orientation (e.g., by using voice feedback to confirm the aisle/shelf information or using image features of the scene).

The image capture assembly 22 includes an imaging component 38 which includes one or more image capture devices, such as digital cameras 40, 42, 44, that are carried by a support frame 46. The image capture devices capture digital images, such as color or monochrome photographic images. The support frame may be mounted to the mobile base 20 and extend generally vertically (in the z-direction) therefrom (for example, at an angle of from 0-30° from vertical, such as from 0-20° from vertical). The cameras are configured to capture images of a full height h of the shelf unit, or at least that portion of the height h in which the labels 18 of interest are likely to be positioned throughout the facility.

One or more of the camera(s) 40, 42, 44 may be moveable, by a suitable mechanism, in one or more directions, relative to the support frame 46 and/or mobile base 20. In one embodiment, at least one of the cameras has a first position and a second position, vertically-spaced from the first position, allowing the camera to capture images in the first and second positions. In the embodiment illustrated in FIGS. 2 and 3, for example, the support frame 46 includes a translation stage 48 for moving one or more of the camera(s) in at least one direction, such as generally in the z (vertical) direction. The direction of movement need not be strictly vertical if the support translation stage is mounted to an angled support frame, as noted above. Optionally, the translation stage 48 provides for rotation of one or more of the cameras in the x, y plane and/or tilting of one or more of the cameras, relative to the translation stage/support frame. In another embodiment, the cameras, and/or their associated mountings, may provide the cameras with individual Pan-Tilt-Zoom (PTZ) capability. The pan capability allows movement of the field of view (FOV) relative to the base unit in the x direction; the tilt capability allows the field of view to move in the z direction; the zoom capability increases/decreases the field of view in the x, z plane (which may be measured in units of distance, such as inches or cm, or angle a, as illustrated in FIG. 2). In some embodiments, only some, i.e., fewer than all, of the cameras are moveable and/or have PTZ capability, where only camera 42 has such capabilities. The incremental movement of the mobile base 20 allows images to be captured along the length of the shelf unit 15 (in the x direction).

Figure 4:
FIG. 4 illustrates an example of an exemplary price tag.

The image capture assembly 22 serves to capture a series of images containing shelf product labels 18, such as product price tags, at sufficient resolution for analysis and product recognition. The product price or tags 18 may be located on the outer edge of a shelf or at the end of a pegboard hook 50, or other product label mounting device. As illustrated in FIG. 4, each price tag 18 generally includes a unique identifier 54 for the product, such as a 1 or 2-dimensional barcode or stock keeping unit (SKU) code. As an example, a 1D EAN-13 code may be printed on or otherwise affixed to the product label. 2D barcodes are commonly referred to as QR codes or matrix codes. In addition, a human-readable price 56 and optionally some descriptive text 58 may be printed on or otherwise affixed to the product label.

A width w of the barcode 54 in the y direction may be about 20-25 mm on many price tags. However, the barcode width may not be uniform throughout the store or from one store to another. In order to allow accurate imaging and decoding of such barcodes, a minimum resolution of approximately 200 pixels per inch (ppi) (78 pixels per centimeter) at the object plane with sufficient depth of focus to allow for differences in x direction position or tilt of the price tags relative to the camera is desirable. For smaller barcodes and 2D barcodes, a higher resolution may be appropriate. A digital camera mounted to a support frame 46 so that it can be relatively stationary while capturing images is thus more suited to this task than a hand-held smartphone camera or inexpensive webcams, unless the acquisition is performed close up (e.g., one barcode at a time with the camera placed very close to the barcode) and the camera is held sufficiently steady. Furthermore, although the locations of price tags are somewhat systematic, there are large variations from shelf to shelf, store to store, and chain to chain, as well as differences in lighting conditions, print quality, transparency of the product label mounting device 50 (if it overlays the product label 18), and so forth. Thus, it may be appropriate to change the design and/or adjust the configuration of the cameras, depending on the expected conditions within the store or portion thereof. An exemplary image capture assembly 22 is adaptable to accept different numbers of cameras and/or different camera capabilities, as described in further detail below.

The exemplary control unit 24 provides both control of the system and data processing. The control unit 24 includes one or more dedicated or general purpose computing devices configured for performing the method described in FIGS. 1 and 5. The computing device may be a PC, such as a desktop, a laptop, palmtop computer, portable digital assistant (PDA), server computer, cellular telephone, tablet computer, pager, combination thereof, or other computing device capable of executing instructions for performing the exemplary method. As will be appreciated, although the control unit 24 is illustrated as being physically located on the mobile base 20, it is to be appreciated that parts of the control unit may be in the image capture assembly 22 or located on a separate computer remote from the mobile base and image capture assembly.

The control unit 24 illustrated in FIG. 3 includes a processor 60, which controls the overall operation of the control unit 24 by execution of processing instructions which are stored in memory 62 communicatively connected with the processor 60. One or more input/output interfaces 64, 66 allow the control unit to communicate (wired or wirelessly) with external devices. For example, interface 64 communicates with cameras 40, 42, 44, to request image capture, and/or adjustments to the PTZ settings, and to receive captured digital images from the cameras; with translation stage 48, where present, to adjust camera position(s); with mobile base 20 for movement of the system as a whole, relative to the shelf unit, and the like. Interface 66 may be used for outputting acquired or processed images, a store profile 13, and/or information extracted therefrom, such as to an external computing device and/or a printer (not shown) for printing and/or packaging sale signage in an appropriate order to match the store profile.

The various hardware components 60, 62, 64, 66 of the control unit 24 may be all connected by a bus 68.

The memory 62 may represent any type of non-transitory computer readable medium such as random access memory (RAM), read only memory (ROM), magnetic disk or tape, optical disk, flash memory, or holographic memory. In one embodiment, the memory 62 comprises a combination of random access memory and read only memory. In some embodiments, the processor 60 and memory 62 may be combined in a single chip. The interface 64, 66 allows the computer to communicate with other devices via a wired or wireless links or by a computer network, such as a local area network (LAN) or wide area network (WAN), or the internet, and may comprise a modulator/demodulator (MODEM), an electrical socket, a router, a cable, and and/or Ethernet port. Memory 62 stores instructions for performing the exemplary method as well as the processed data.

The digital processor 60 can be variously embodied, such as by a single-core processor, a dual-core processor (or more generally by a multiple-core processor), a digital processor and cooperating math coprocessor, a digital controller, or the like. The digital processor 60, in addition to controlling the operation of the computer 62, executes instructions stored in memory 62 for performing the methods described herein.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 5:
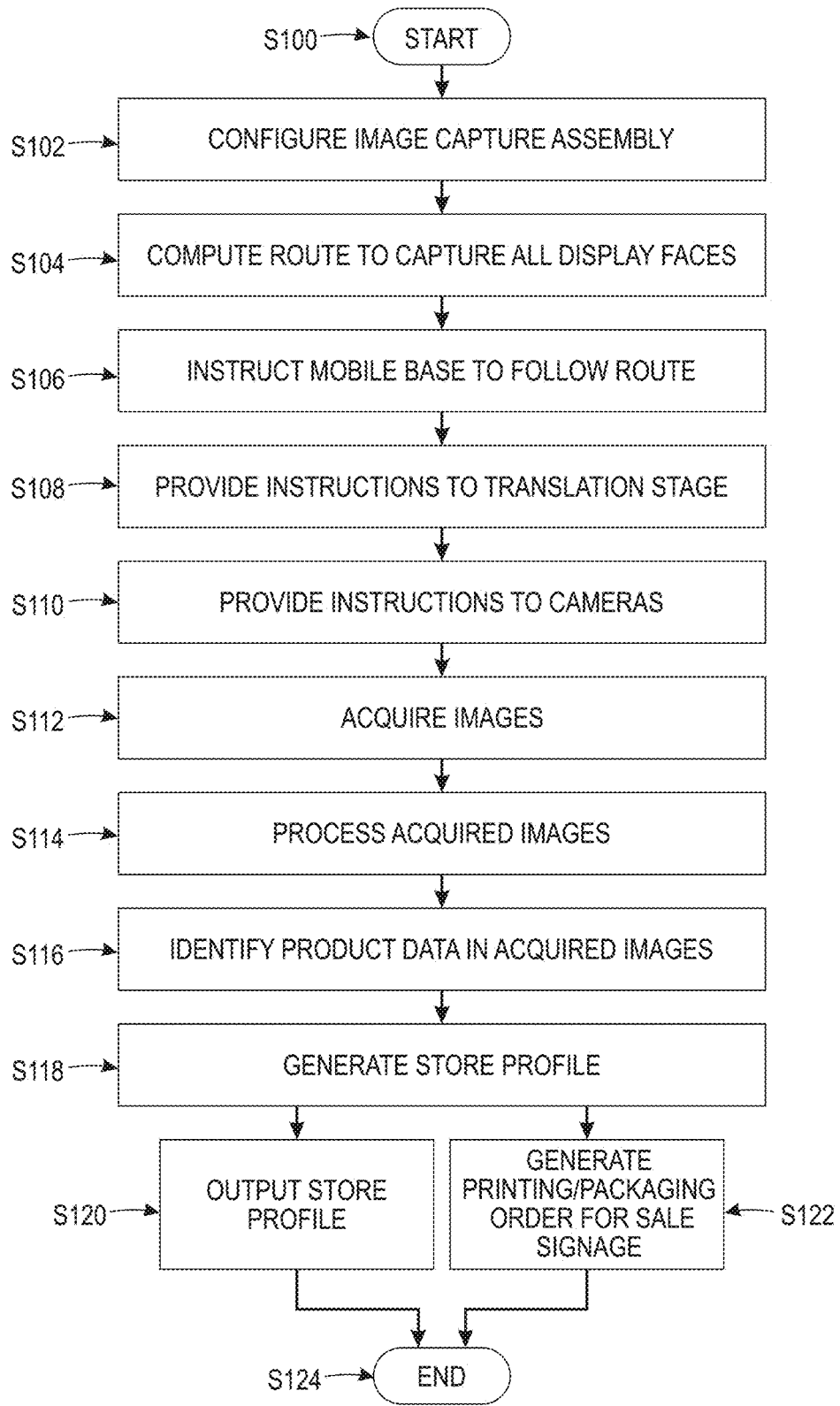
FIG. 5 is a flow chart illustrating a store profile generation method in accordance with another aspect of an exemplary embodiment of this disclosure.

According to an exemplary embodiment, the processor 60 executes instructions 70 stored in memory 62 for performing the method outlined in FIG. 5 and elsewhere herein. In the illustrated embodiment, the instructions include a configuration component 74, a mission planner 76, a translation stage controller 78, a camera controller 80, an image data processing component 82, a product data recognition component 84, a store profile generator 86, and a signage generator 88. Fewer than all these components may be included in some embodiments. In other embodiments, some or all of the components may be located on a separate computing device, i.e., one which is not carried by the mobile base, as discussed above.

The configuration component 74 is used prior to a mission to configure the image capture assembly 22 (e.g., determine FOV and position(s) of the camera(s) and to provide a spatial characterization of the image capture assembly, such as a spatial profile for each camera. Each camera may have at least one camera spatial profile. A camera may have two or more spatial profiles if the camera is to be moved, relative to the mobile base, and/or its FOV adjusted, for acquiring more than one image at the same mobile base location. The camera spatial profile may be a mapping between pixel location and a location in an x, z plane to enable a mapping between pixels of each image captured at a respective camera position and a position in the x, z plane corresponding to a portion of a shelf face where the images are captured.

The mission planner 76 has access to a store floor plan 90 (layout of aisle and shelves and its facing) and the purpose of each mission. A mission may be for example, to capture all price tags throughout the store, or limited to only a part of the store, etc. Using the information in the store floor plan 90, the mission planner determines the path that the mobile base 20 should follow and communicates with the mobile base to provide the path and appropriate stop positions (where the images should be acquired by the image capture assembly). The instructions may be provided to the mobile base in a step-by-step fashion or in the form of a full mission.

The translation stage controller 78 determines the translations of the translation stage to achieve desired camera positions and communicates them to the translation stage 48. The camera controller 80 determines the camera parameters (e.g., shutter speed, aperture, ISO number, focal length, . . . ) and optionally position parameters (e.g., pan, tilt, zoom, or vertical translation amount . . . ) of the cameras in the image capture assembly for each position that requires image acquisition. These parameters may be fixed throughout the mission and/or adjusted dynamically based on current location information of the mobile base (e.g., distance to the shelf to be imaged, the facing angle, height of the shelf . . . ). As will be appreciated, translation stage controller 78 and camera controller 80 may form parts of a single component for controlling the acquisition of images by the image capture assembly 22.

The image data processing component 82 processes the images acquired by all the cameras and uses the mapping provided by the configuration component and position information provided by the mobile base to map pixels of the captured image to locations in 3D space.

The product data recognition component 84, which may be a part of the image data processing component 82, analyses the processed images for detecting price tag locations, extracting product data 26, such as price tag data, and performs image coordinate conversion (from pixel position to real-world coordinates).

Outputs of the data processing component 82 and/or product data recognition component 84 may be used by the store profile generator 88 to determine the store profile 13 (e.g., the real-world coordinates of detected and recognized UPC codes). In some cases, outputs of the data processing component 82 and/or product data recognition component 84 are used by the translation stage controller 78 and/or camera controller 80 to determine what should be the appropriate camera parameters and/or position parameters for the next image capture. Some outputs of the data processing component 82 and/or product data recognition component 84 may be used by the mission planner 76 to determine the next positional move for the mobile base 20.

With reference now to FIG. 5, a method for generating (and using) a store profile 13 is shown, which can be performed with the system of FIGS. 2 and 3. As will be appreciated, some or all of the steps of the method may be performed at least partially manually and need not be performed in the order described. The method begins at S100.

At S102, the image capture assembly 22 is configured. Briefly, the configuration component 74 identifies suitable positions for the cameras 40, 42, 44, and optionally a suitable range of camera parameters (e.g., field of view, exposure time, ISO number, etc.), in order to capture the full height h of each shelf unit face from a set of overlapping images acquired at one single position of the moveable base (i.e., without gaps in the z direction). The configuration component 74 optionally extracts information from test images which enables it to associate each (or some) pixels of a captured image with a point in yz space and/or to generate a spatial characterization of the image capture assembly which may include a spatial profile for each camera.

At S104, a route for scanning the store shelves is computed. In particular, the mission planner 76 computes a route for the mobile base around the facility, based on a store floor plan. The floor plan identifies obstructions, particularly locations of shelf units. The store plan may have been generated partially automatically, from a prior traversal of the facility by the system 14, for identifying the location of obstructions. The mission planner 76 computes a route, which includes all the faces and designates parts of the route as a scan path (where images of scannable faces are to be acquired) and parts of the route as a no-scan path (where no images are to be acquired).

At S106, the mission planner 76 communicates the computed route to the navigation component 30 of the mobile base, and optionally designating stop positions, which may be located at approximately equal intervals along the scan path. During the mission, the mission planner 76 receives information from the navigation component 30 from which any deviations to the planned route are computed. The mobile base 20 is then responsible for navigating the system 14 to a desired location with desired facing (orientation) requested by the control unit 24 and reporting back the actual location and facing if there is any deviation from the request.

At S108, as the mobile base 20 traverses the route, instructions are provided to the translation stage 48 at each predetermined stop on the scan path for positioning the cameras. The translation stage controller 78 communicates instructions to the translation stage 48 when the camera position(s) is/are to be adjusted and may provide the translation stage 48 with directions for achieving predetermined camera positions, based on the information generated by the configuration component 74.

At S110, at each predetermined stop on the scan path, instructions are provided to the cameras 40, 42, 44 themselves for positioning and image acquisition. In particular, the camera controller 80 communicates instructions for adjusting position and/or focal plane to the camera's PTZ components and provides instructions for data acquisition to provide the optimal coverage of the shelf, using the position information identified by the configuration component 74. The translation stage controller 78 and camera controller 80 may work in cooperation to achieve desired positions of the cameras.

At S112 images 100, 102, are acquired by the cameras at a given position of the mobile base. The image capture assembly (iteratively) acquires images based on the requests by the control unit and the camera parameters and (optionally) position parameters provided.

At S114, the acquired images 100, 102 are transferred from the camera memory to the data processing component 82. The data processing component 82 receives the images acquired by the cameras and stores them in memory, such as memory 62, and may perform preliminary processing, such as adjustments for blur, color, brightness, etc. A composite image or panorama of the shelf face may be computed by performing a union of multiple images captured by the image capture assembly. In forming the composite image, pixels of one or more of the acquired images may be translated to account for each camera's spatial profile.

At S116, the product data recognition component 84 processes the acquired images 100, 102 or panorama to identify product data 26 from the captured shelf labels 18, where present, in the images. In an exemplary embodiment, the acquired images and a corresponding coarse location and facing information are analyzed to determine the product layout information (e.g., via barcode recognition of price tags and knowledge of the camera spatial profile).

The process repeats until the mission is completed (e.g., all aisles of interest have been scanned). For a typical mission, the mobile base moves along each store aisle to enable images of the scannable faces of each shelf unit to be captured. From the captured images, each shelf price tag is detected and its location determined within the image.

By measuring the mobile base's current position in the store floor plan, its position data can then be associated with the images being captured at that position, based on the time of capture. Candidate regions of each image 100, 102 which have at least a threshold probability of including a barcode 54 are identified and processed to extract the barcode information, which may be output as an SKU code which uniquely identifies the product. Associated information, such as price and product information 56, 58, particular colors used in the product label 18, and the like, may also be used to locate the barcode and/or to decipher it, particularly where the product data recognition component has difficulty in doing so based on the barcode alone. The location of the barcode in three dimensional space can be determined based on the location of the mobile base at the time the image was captured and the spatial characterization of the image capture assembly.

At S118, a store profile 13 is generated based on the identified barcode information 26 and computed barcode locations. In particular, the store profile generator 86 generates a store profile 13 which identifies locations of the price tags 18, based on the extracted barcode information and optionally information provided by one or more of the configuration component 74, mission planner 76, and navigation component 30, through which pixels of identified barcodes in the captured images are associated with a point in real (xyz or xy) space or otherwise generally located with respect to the store floor plan. An accurate store profile 13 identifying product locations/locations of price tags in a store can thus be reconstructed.

At S120, the store profile 13 may be output from the system.

At S122, information on signage to be mounted throughout the store may be received and a packaging order for the particular store computed, based on the store profile 13. In particular, the signage generator 88 receives information on signage to be printed for an upcoming sale in which only some but not all of the price tags may need to be replaced. The signage generator uses the store profile 13 to identify the locations of only the price tags/products to which the sale relates. From this information, a printing and/or packaging order for the signage is generated. When the signage is packaged and provided to an employee, the order in which the signage is packed in accordance with the computed printing and/or packaging order enables the person to traverse the store in the order in which the signage is packaged to replace/add the new signage, generally in a single pass through the store. The route defined by the packing order minimizes the amount of backtracking the employee needs to do and/or provides for a shorter path (in time or distance) to complete the task than would be achievable without the computed store-specific packaging order, and avoids the need for the store to resort the signage into an appropriate order. In this way, for each store in a chain, a store profile can be generated (e.g., periodically), allowing a store-specific packaging order for signage to be computed each time a set of shelf labels 18 and/or other signage is to be mounted throughout the store.

The method ends at S124.

Further details of the system and method are now described.

Store-shelf imaging module 2 [on-line process]

This module acquires shelf images for barcode localization and recognition 10, promotional price tag detection 12, and for image stitching 6. It may also supply images to the device characterization module 4 so that the spatial characteristics in the imaging system and color characteristics among digital-world, printing, and imaging devices can be learned. An example store-shelf imaging system is shown in FIGS. 2-5, which is capable of navigating the store autonomously, acquiring product shelf images, and keeping track of imaging locations and poses of all the acquired images.

Device Characterization Module 4 [Off-Line Process]

This module characterizes the individual and combined interaction among relevant devices such as a digital template to printing device, print to imaging device etc. and feeds the information to the modules involving PPT detection. It characterizes two aspects of the system: spatial characteristics in the imaging system and color characteristics among digital-world, printing, and imaging devices. For spatial characterization, the objective is to derive parameters or transformations describing within-camera distortion and across-cameras stitching enabling the performance of model-based image stitching on the acquired images as described in U.S. Patent Publication No. 2016/0119540, published Apr. 28, 2016, by Wencheng Wu, and entitled, "MODEL-BASED PLANE-LIKE PANORAMA AND RETAIL APPLICATIONS" without involving any intensive image stitching algorithms.

An exemplary method for performing spatial characterization of the imaging system is disclosed in U.S. Patent Application Publication No. 2015/0365660, published Dec. 17, 2015, by Wu et al., and entitled "METHOD AND SYSTEM FOR SPATIAL CHARACTERIZATION OF IMAGING SYSTEM".

Figure 6A:
FIG. 6A shows printed PPTs and FIG. 6B shows the corresponding imaged PPTs.
Figure 6B:

For color characterization, the goal is to derive parameters or transformations describing the color relations among digital-world, printing, and imaging devices. This is very important for the purpose of PPT detection since color is one of the dominant features for detecting PPT. For a coarse scale, a "green" color patch on a digital file, will be "green" on the print, and will be "green" on the images captured by the cameras. But using this coarse scale for PPT detection will result in a large false-positive rate. For it to be useful, the system needs to know the "green" color patch on a digital file has (R,G,B)=(0,166,0) or (R,G,B)=(0,166,80). Even if the system knows which green the color patch is, (0,166,80), on the PPT, the green seen by the camera, (22,59,42), may be quite different due to the color characteristics of the cameras. FIG. 6 illustrates examples of a color and intensity shift associated with an imaging system resulting from a transition from a digital color space to printing to imaging, where FIG. 6A shows printed PPTs and FIG. 6B shows the corresponding imaged PPTs. Without the system knowing such color and intensity shift, the PPT detection algorithm needs to be quite conservative and thus may cause undesirably large false-positive rate. An elegant approach to solve these color shift issues is to concatenate printer profile and camera profile to yield a combined color profile T: $(R,G,B) \rightarrow (R^{camera}G^{camera}B^{camera})$, which describes how any (R,G,B) in a digital original maps to a new color $(R^{camera}G^{camera}B^{camera})$. This method leverages existing color profiling technologies related to color profiling of printers, scanners, etc. and provides transformations for all possible colors using one process. A drawback is that the system now needs access to these color profiles or is required to generate or construct these color profiles. Furthermore, if the imaging condition or printing condition changes, the mapping needs to be re-derived. A simpler and more effective solution is to build only a sparse table (transformation) that only covers the unique colors used by a retail chain for its set of PPT templates. In that case, one only needs to print a copy of each PPT template, image them with the store-shelf imaging module, and build a sparse table. FIGS. 6A and 6B show an example of all the PPT templates for the shelf-products associated with images from a store-shelf imaging prototype system and the corresponding sparse table is shown below. As indicated, there are significant changes in saturation and color shifts.

TABLE 1

Sparse Color Profile Table

| | |
|---|---|
| red | (238, 28, 35) → (167, 89, 84) |
| yellow | (255, 242, 0) → (185, 194, 93) |
| blue | (39, 80, 163) → (42, 73, 137) |

The configuration component 74 of the system 14 provides for automatic characterizing of the spatial characteristics of the image capture assembly 22 and for configuring of the data processing component 82. The outputs, e.g., spatial profiles of the imaging system, may be used by the store profile generator 86 for determining product layout in terms of real-world coordinates, for determining the path/pace of the mobile base 20, and the like. The configuration component can be applied iteratively to configure/optimize the image capture assembly 22 for the specific setting of each retail application.

Figure 7:
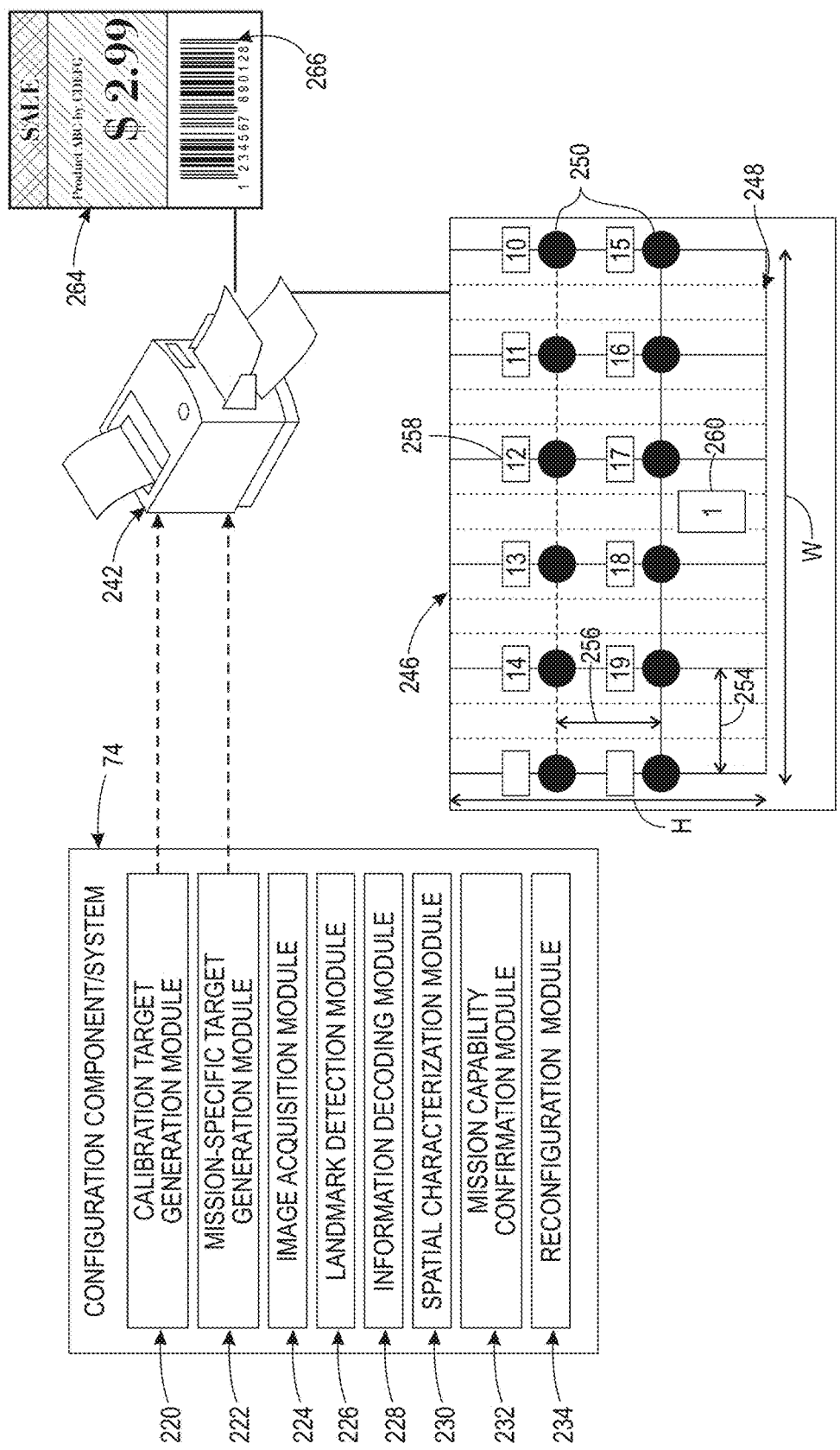
FIG. 7 illustrates a spatial characterization configuration component, a section of an associated modular calibration target and an associated mission-specific target according to an exemplary embodiment of this disclosure.

FIG. 7 illustrates a spatial characterization configuration component, a section of an associated modular calibration target and an associated mission-specific target according to an exemplary embodiment of this disclosure. As illustrated in FIG. 7, the configuration component may include a calibration target generation module 220, a mission-specific target generation module 222, an image acquisition module 224, a landmark detection module 226, an information decoding module 228, a spatial characterization module 230, a mission capability confirmation module 232, and a reconfiguration module 234, although fewer than all of these modules may be provided in some embodiments.

The calibration target generation module 220 includes instructions (e.g., a template) for generating a spatially-characterized calibration target 240 (FIG. 8), when printed on sheets of paper by a communicatively linked printer 242, or otherwise output in tangible form. The calibration target 240 may be sectional and composed of a plurality of sections 246 (FIG. 7), which when assembled sequentially in a predefined order, form a target 240 of sufficient height to cover the portion h of the shelf face where product tags 18 are expected to be found. In other embodiments, the target 240 may be printed as a continuous length which may be cut to size at the store.

Figure 8:
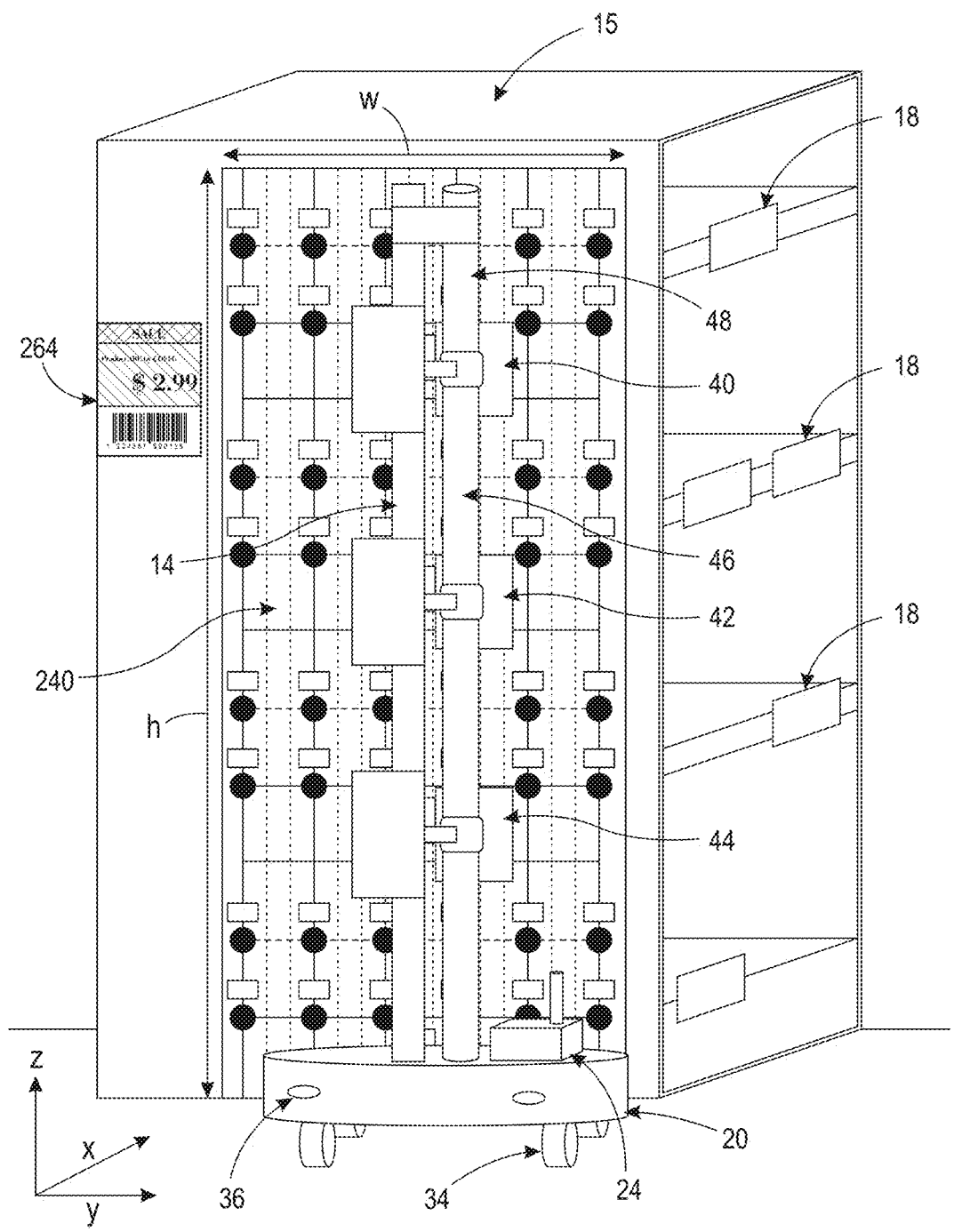
FIG. 8 illustrates a calibration target mounted to a vertical surface being used for the spatial characterization of an exemplary embodiment of a store profile generation system according to this disclosure.

As illustrated in FIG. 7, each of the sections 246 has a width W (in a direction corresponding to the x direction, during a mission) and a height H in the z direction. The sections 246 may be taped or otherwise joined together to overlap at 248 to form a target 240 with a width W and a height h as shown in FIG. 8 which illustrates a calibration target mounted to a vertical surface being used for the spatial characterization of an exemplary embodiment of a store profile generation system according to this disclosure. Each section 246 includes a plurality of machine-readable, visually-identifiable landmarks 250 with known positional information. In the illustrated embodiment, the landmarks are equally sized and spaced at predetermined intervals 254, 256 in W and H directions, respectively, to form a grid. Each section 246 includes an identical set of landmarks 250. The positional information may be encoded by a set of machine readable and visually recognizable location-encoding marks 258 which encode locations of the landmarks 250. The marks 258 may each be located adjacent the corresponding landmark 250 or positioned on the landmark itself. In the exemplary embodiment, the locations of the landmarks are encoded by human-readable identifiers, such as numbers, in the location-encoding marks 258. Each section 246 may include a human readable identifier 260, such as the section number, which assists a person in assembling the sections in the correct order and orientation to form the target.

The mission-specific target generation module 222 includes instructions for generating examples of one or more printable mission-specific targets 264, which may be combined with the calibration target 240. Additionally, known target information may be encoded by a second set of machine readable and visually recognizable marks (mission-info-encoding marks). In particular, the target 264 may be representative of the product tags to be identified in the store, and include, for example, a barcode 266 similar in size to the barcodes on the product tags 18, and/or or other machine readable information. The mission-specific targets 264 may be printed on one or more of the sections 246 or on separate sheets of paper, to be positioned, for example, adjacent to or on the target (FIG. 8). As will be appreciated, the generation of the calibration target and mission specific targets may be performed offline, prior to configuration of the system, and these components may be part of a separate computing device and not resident on the moveable system.

The image acquisition module 224 acquires test images using the image capture assembly 22 to be spatially characterized and/or configured. As will be appreciated, the camera controller 80 and stage controller 78 may serve as the image acquisition module 224 and/or may communicate with module 224 for acquiring the test images of the target(s) 240, 264.

The landmark detection module 226 detects the identifiable landmarks 250 and their positions on the acquired images of the target 240.

The information decoding module 228 detects the set(s) of machine readable and visually-recognizable marks 258, 266 on the acquired images of the target(s) 240, 264 and then decodes the corresponding locations of identifiable landmarks 250 from the associated location-encoding marks. Information 266 from the mission-specific targets in the images may also be decoded.

The spatial characterization module 230 matches the positions of landmarks 250 detected by module 228 to the actual positions on the target 240 and then derives absolute and relative spatial profile(s) and other characteristics of the imaging system.

The mission capability confirmation module 232 analyzes the acquired images to extract information from the mission-specific image targets 264, such as from the example barcodes 266, and compares this against the known information of the image targets, to determine whether the information matches (e.g., determine if the barcode captured in the image can be read to generate a SKU number corresponding to the known SKU number of the printed barcode 266). This allows the module 232 to confirm/assess the capability of the system to perform the mission. In the case where the barcode cannot be read correctly, the module 232 outputs information to the configuration computation module 234.

The reconfiguration module 234 may utilize some or all of the following information to compute a new configuration for the image capture assembly 22: the characterized spatial profile(s) of the imaging system, the knowledge of the parameters of the current configuration of the imaging system, and the knowledge of the system requirements (which may be mission dependent, store dependent, application-dependent, etc.). The module 234 may compute a modified (improved) configuration for the image capture assembly 22, e.g., one which is able to capture more of the shelf face and/or provide sufficient resolution to capture barcode information from the product price tags 18.

Figure 9:
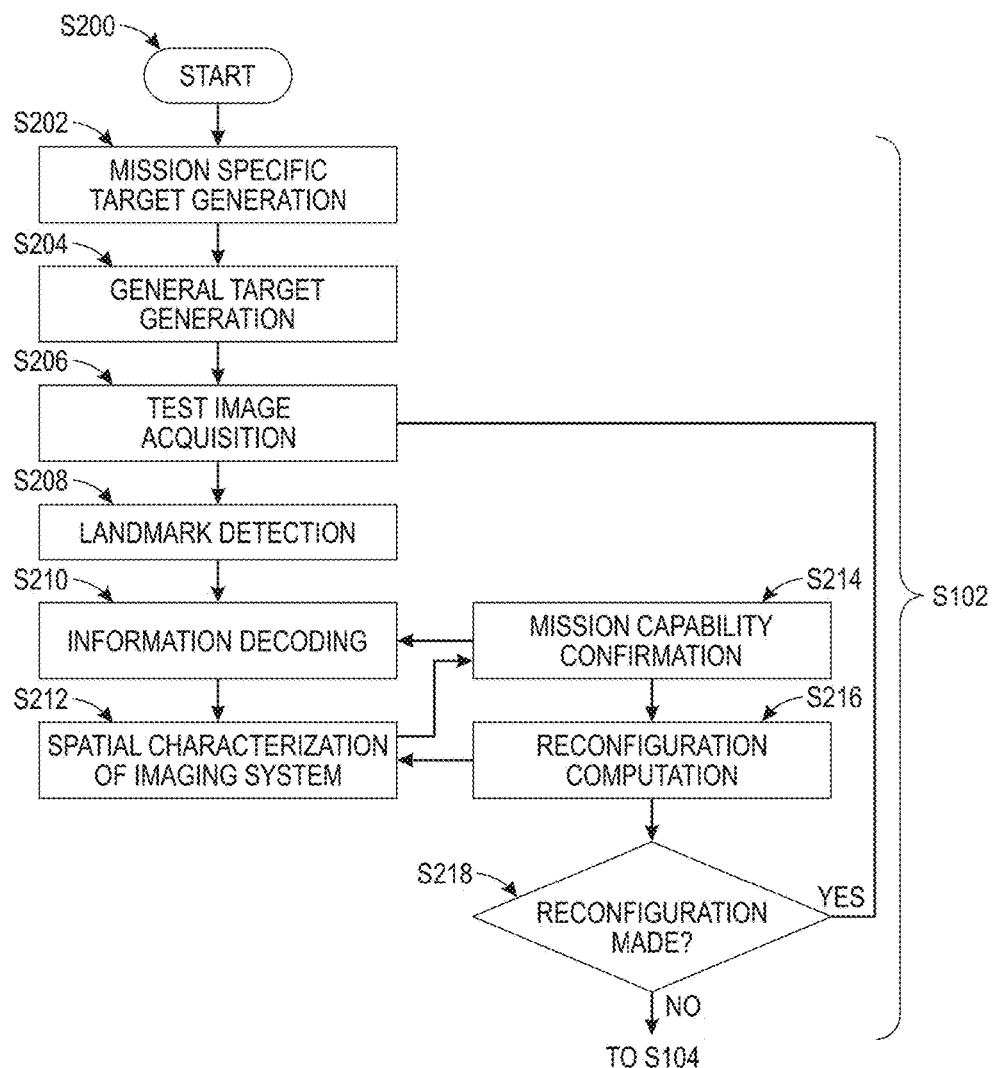
FIG. 9 is a flow chart illustrating a method for configuration and/or spatial characterization of an image capture assembly according to an exemplary embodiment of a store profile generation system according to this disclosure.

FIG. 9 illustrates an exemplary configuration process, which can be performed with the modules of FIG. 7. The method begins at S200.

At S202, mission-specific targets 264 may be generated by module 222, in cooperation with an associated printer 242.

At S204, a calibration target 246 is generated by module 220, in cooperation with an associated printer 242. Step S202 may be incorporated into the generation of a calibration target which includes the mission specific target(s).

At S206, test images are acquired by module 224, in cooperation with the image capture assembly 22.

At S208, landmarks are detected in the acquired test images by the module 226.

At S210, the information 258, 266 in the acquired test images is decoded, where possible, by the module 228.

At S212, the image capture assembly 22 is spatially characterized, by the module 230.

At S214, the capability of the system 14 for performing the mission is assessed, by the module 232, based on information provided by the modules 228, 230.

At S216, a reconfiguration of the image capture assembly 22 is computed by the component 234, which may be output to the stage controller 78 and/or camera controller 80 for reconfiguring the image capture assembly 22. If at S218, a reconfiguration of the image capture assembly 22 has been made, the method may then return to S206 for another iteration of the system configuration, otherwise, the method may proceed to S104, where a mission is commenced.

Image Stitching Module 6 [On-Line Process]

This module performs model-based image stitching (see U.S. Patent Publication No. 2016/0119540, published Apr. 28, 2016, by Wencheng Wu, and entitled, "MODEL-BASED PLANE-LIKE PANORAMA AND RETAIL APPLICATIONS") to build panorama images of the store shelf. The main goal of this module is to provide stitched images for the PPT detection. By stitching acquired images, the system is able to "patch" partial PPT images in the non-stitched version into a full PPT images that are easier to detect with a rule-based detection method. An example is shown in FIG. 10, where FIG. 10A shows the original non-stitched images, and FIG. 10B shows the stitched image via model-based image stitching method.

Notably, model-based image stitching is not perfect, i.e., limited, due to the accuracy of the robot navigation and localization. However, stitching via a table look up is relatively efficient and is accurate enough for PPT detection if coupled with appropriate heuristic rule-setting and imaging processing techniques that are described below.

Figure 10A:
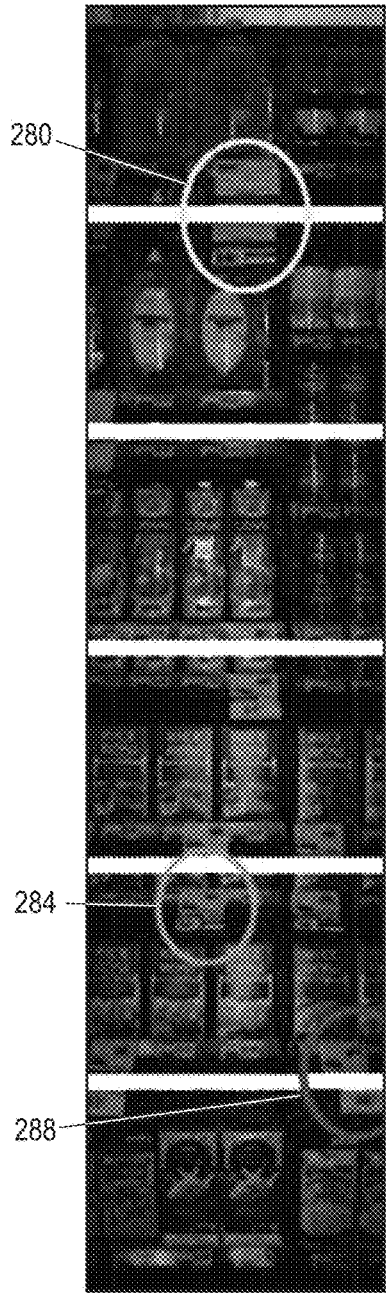
FIG. 10A shows an example of original non-stitched captured images and FIG. 10B shows an example of the corresponding stitched images via a model-based image stitching method according to an exemplary embodiment of this disclosure.
Figure 10B:
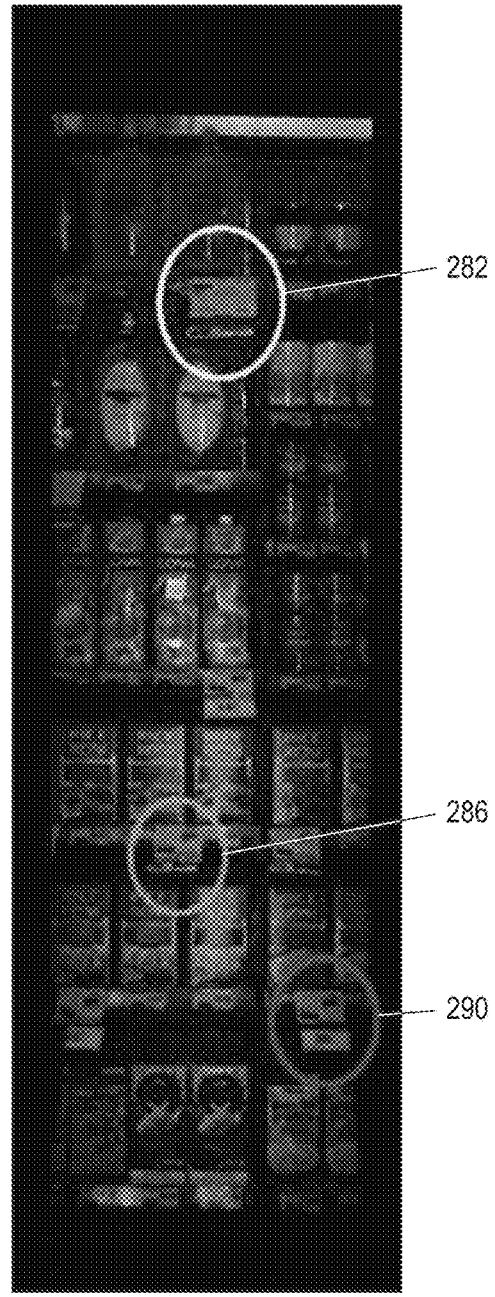

With reference to FIGS. 10A and 10B, regions 280 and 282 clearly show the benefit of performing PPT detection on the stitched image. The barcode of this PPT only shows up in one of the non-stitched images, but unfortunately, not enough color patches are in the same non-stitched image. The non-stitched image that has sufficient color patches does not include a barcode and will result in a "cut-off" or "cut-off in vertical direction" failure mode without stitching. Note that the stitched image has sufficient white and color patches but is somewhat distorted. During the rule-setting process described below, larger thresholds are specified to yield improved detection.

Regions 284 and 286 is the case where PPT detection methods with or without stitching provide acceptable results since the barcode shows up un-split in one of the non-stitched image.

Regions 288 and 290 also show the benefit of performing PPT detection on a stitched image. However, even in the stitched image there is a gap between the color patches. To deal with that, a vertical morphological closing operation is performed to merge them into one region. The recommended vertical structure to be used for this image processing technique should be at the range of the gap of the imaging device existed known from device characterization. According to an exemplary embodiment described herein, a 10 mm gap was used.

In the example in FIG. 10B, all the camera images were stitched together vertically to form a single column image that was then analyzed by the promotional price tag detection module described below. Since the purpose in performing vertical stitching of the images is to "join" promotional tags that may have been split between two images, an alternative embodiment could stitch the images two-at-a-time (pairwise) and perform the detection on each pair of images rather than stitching all images together.

Figure 11:
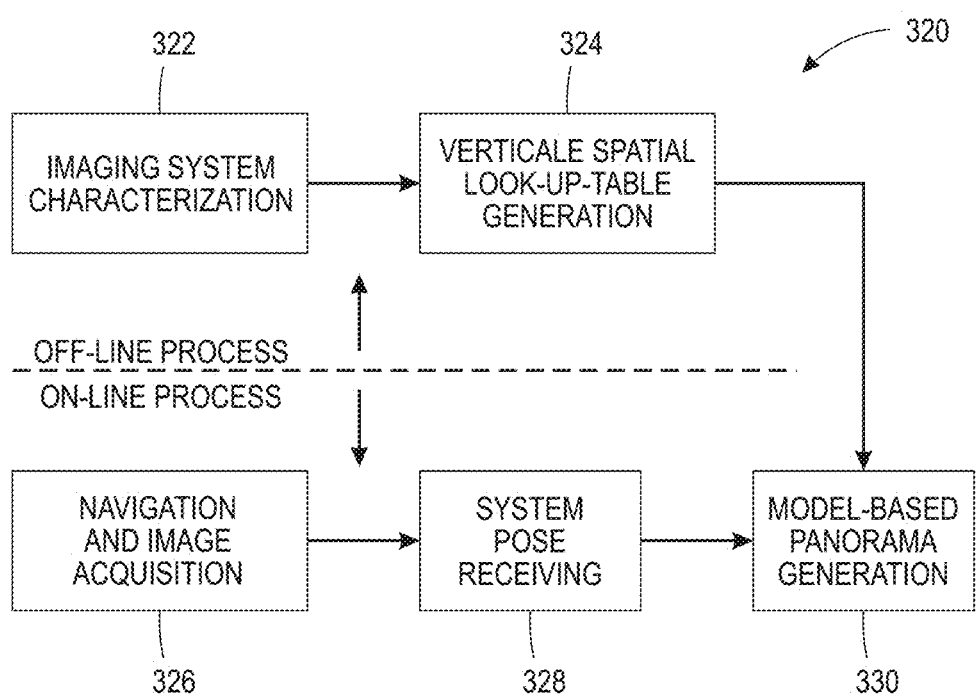
FIG. 11 is a block diagram depicting a system to construct model-based plane-like planogram (shelf product layout) compliance, misplaced item detection, inventory management, etc., in accordance with an exemplary embodiment of this disclosure.

FIG. 11 illustrates a schematic diagram depicting a system 320 for constructing model-based plane-like panorama of store-shelf for various retail applications such as planogram (shelf-product layout) compliance, misplaced item detection, inventory management virtual store for shoppers, etc., in accordance with a preferred embodiment. The output is a collection of plane-like panoramas representing a snapshot of the aisles of a store, which can be further analyzed or rendered for many retail applications. System 320 includes a number of modules, including, for example, an imaging system characterization module 322, which determines spatial characteristics of the imaging system [e.g., off-line], and a vertical spatial look-up-table generation module 324 which generates spatial look-up-table(s) (LUTs), referred as vertical panorama models, to be used for on-line building of plane-like panorama in vertical direction [e.g., also off-line].

System 320 also includes a navigation and image acquisition module 326, which acquires images using the characterized imaging system as it navigates through the retail store. System 320 also includes a system pose receiving module 328 which receives the corresponding system pose information, such as location of imaging system, distance, and orientations to the shelf plane, as each image is acquired. Finally, system 320 can include a model-based panorama generation module 330, which generates 2-D plane-like panorama utilizing the acquired images, the received system poses, and the generated vertical panorama model(s).

The imaging system characterization module 322 determines the spatial characteristics of the imaging system. The outputs of module are spatial profiles describing the relationship of image pixel coordinates and the real-world coordinates.

Figure 12:
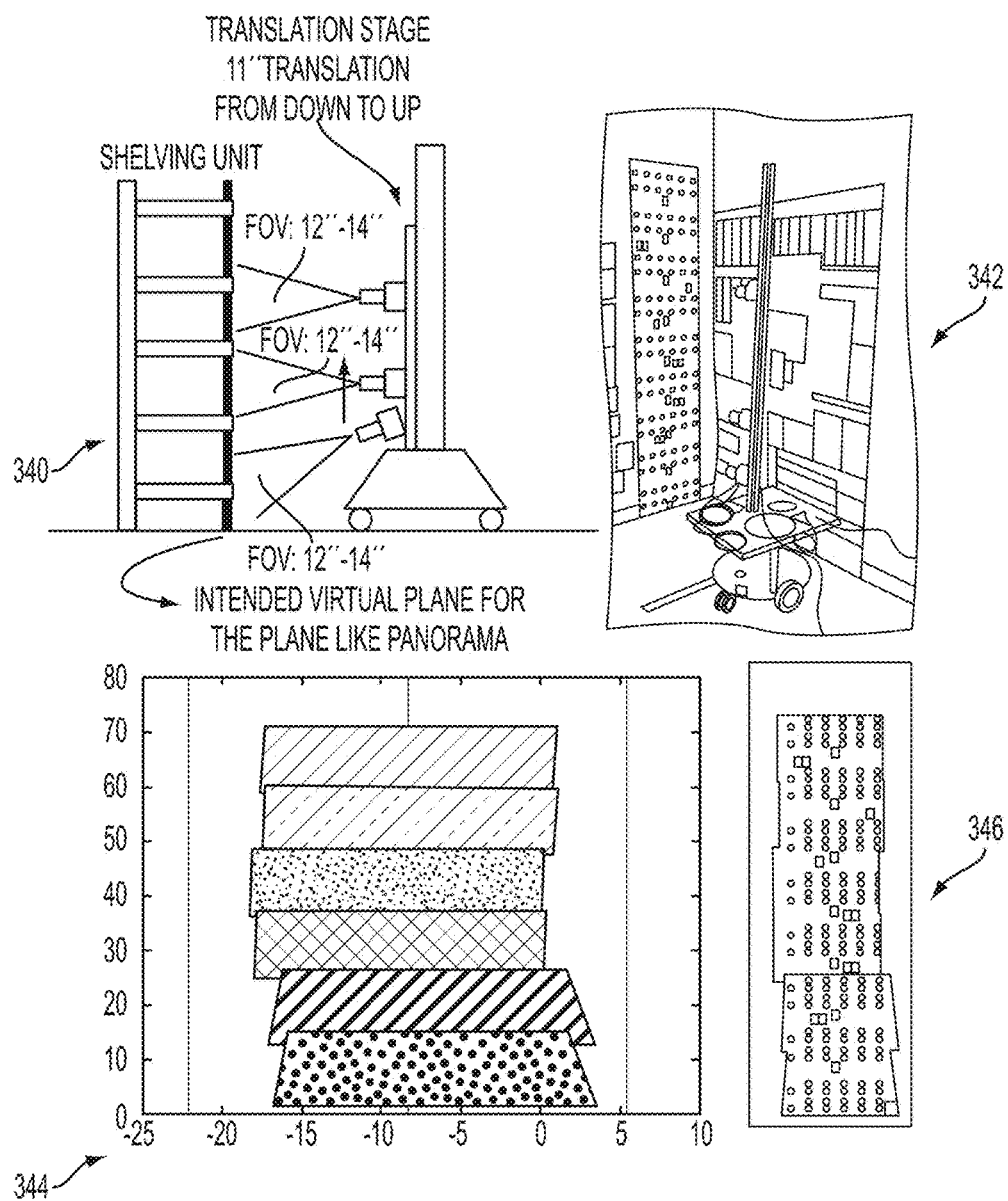
FIG. 12 includes various depictions of a mobile imaging system which generates planograms according to an exemplary embodiment of this disclosure.

FIG. 12 shows an example robot with an imaging system that has been developed for a shelf production identification project, and which can be implemented in the context of an embodiment. Such an example configuration can be chosen to cover a maximal shelf height of, for example, 6 feet. Graphic 340 in FIG. 12 illustrates intended parameters of the imaging system including the virtual plane intended for building plane-like panorama. Graphic 342 depicted in FIG. 12 indicates a photo of an actual system looking at a calibration target at a wall of a store. Graphic 344 shows a plot of the characterized FOVs of a 6 sub-imaging system. Finally, graphic 346 illustrates the vertical panorama of the calibration target on the wall using the disclosed methodology. It should be appreciated that the proposed method here is not limited to a specific configuration.

As shown in graphic 344, the outputs of this module are six camera projective matrices, $$P_{k(d)}:(i,j)\rightarrow(x,z)\ k=1\sim6$$

where d is the distance from the imaging system to shelf plane of interest. Since our imaging system is really a system of 3 cameras with 2-positional array rather than a system of 6 cameras, the six camera projective matrices can also be represented by 3 camera projective matrices with two possible sets of translation parameters. Without loss of generality, our discussion in the remaining document will treat these six camera projective matrices as if they are completely independent.

The vertical spatial look-up table generation module 324 [off-line] generates spatial look-up-table(s) (LUTs), referred as vertical panorama models, to be used for on-line building of plane-like panorama in vertical direction. The key idea is to pre-construct a spatial look-up-table(s) including pixel indices and optionally interpolation weights based on the determined spatial characteristics of the imaging system from the previous module.

As an example, the outputs of the imaging system characterization modules may be $P_{k(d)}:(i,j)\rightarrow(x,z)\ k=1\sim6$, where d is the distance from the imaging system to shelf plane of interest. The typical operation for shelf product identification uses d=2.5' as the nominal value. However, it is beneficial to characterize the imaging system at multiple distances around nominal since the mobile base may not always be able to navigate exactly. This would also allow the algorithm to compensate the imperfection of navigation for better quality panorama if desired.

For simplicity, assume that the mobile base can indeed navigate close enough to d=2.5'. Thus, only $P_k^{(2.5)}$, k=1~6 is needed. One embodiment of building the spatial LUT is as follows:

Make the x-center of $P_k^{(2.5)}$ to 0 by adding an offset in the system, an offset is added so that the average x of the top camera equals to 0. The center of x should be moved, but not z since the characterization system is absolute in z but relative in x.

Determine the desired resolution of Δx and Δz in the final model-based panorama. For many retail applications, the present inventors have found that 0.025" are more than sufficient.

Create 2-D mash-grid of x=−NΔx~NΔx, z=ΔzMΔz, i.e., creating a set of (x,z) coordinates that correspond to an image of M×(2N+1) array with physical size of height=MΔz and width=2N+1Δx that center at x=0.

Create a spatial LUT that has M×(2N+1) entries, each entry stores the image sequence ID(k), the pixel location(s) to be used for reconstructing this entry online, and optionally the weights for interpolation among these pixels. Conceptually, the spatial LUT is like a map that tells you for each pixel $(x_i,z_i)$ in the panorama where you should find the image data out of the k images and how to use them for interpolating the data.

There can be many embodiments for the final step. The simplest embodiment can involve building a spatial LUT that achieves nearest neighbor interpolation. To do that, a pseudo code such as disclosed below can be employed:

For each $(x_i,z_i)$, find the LUT entry (k, $i_k$, $j_k$) by
1. Initialize (k, $i_k$, $j_k$)=(0,0,0)
2. For I=1~6,
   2.1 Perform inverse spatial mapping on $(x_i,z_i)$, using $P_i^{(d)}$, i.e., $(\hat{i}, \hat{j})=(P_j^{(d)})^{-1}(x_i,z_i)$.
   2.2 If $(\hat{i}, \hat{j})$ is within the image dimension of $I^{th}$ image, then update (k, $i_k$, $j_k$) to I,round($\hat{i}$), round($\hat{j}$).

If (k, $i_k$, $i_k$)=(0, 0, 0) for a point after the above algorithm, that means that there is no data available for interpolate that point in panorama (e.g., a hole in the imaging system due to none-overlap region or simply out of the range of the FOVs of the imaging system). If a point is at the overlap region among multiple sub-imaging system, the above algorithm would use the data from the largest k (in our case, if is the bottom camera). One can also consider computing average rather than just picking one. This method does not store any weight since it uses the nearest neighbor interpolation scheme. The "nearest neighbor" comes from the operation: d(•). For a given resolution of panorama, this method stores the smallest LUT and is most efficient in computation. Conceptually, it is equivalent to pick pixel value directly (without any interpolation) from k images to fill in the panorama.

The above pseudo code can be easily extended to higher order interpolation. For example, to extend it into bilinear interpolation that uses 4 neighboring pixels with weights, one only need to replace the operation round(•) with fractional numbers and use the fraction and 1-fraction, as the weights. However, special care needs to be considered when the pixel is at the image border since the 4 neighboring pixels may come from different images now. In any case, this is not a limitation of our algorithm just more complicated.

This spatial LUT can be referred to as the vertical panorama model because its role is to stitch the k images acquired by our imaging system along the vertical direction. As our imaging system move along the aisle of the store, we would then stitch these individual vertical units of panorama along the horizontal direction to form a full panorama of the aisle. More details will be discussed below.

Rule Generation Module 8 [Off-Line Process]

This module generates rules and useful parameters to be used by the PPT detection module. More details can be found in U.S. patent application Ser. No. 14/637,830, filed Mar. 4, 2015, by Wu et al., and entitled "SYSTEM AND METHOD FOR RETAIL STORE PROMOTIONAL PRICE TAG DETECTION VIA HEURISTIC CLASSIFIERS". The system and method disclosed here includes color mapping provided from the device characterization module that accounts for the color shifts from the digital world to the imaging world and is incorporated into the parameters for color related rules. Using the sparse profile transformation shown in table 1 as an example, instead of having a color patch rule that says the hue for green is around (0,0.67) by previous methods without color profiling, the color patch heuristic rule generated indicates the hue for green is around (0.18,0.50), providing a significant improvement in performance.

In Table 2 below, shown is an example of derived parameters for a heuristic rules and classifier according an exemplary embodiment of this disclosure.

The heuristic promotional price tag description extractor module 418 extracts 15 heuristic descriptions of exemplar promotional price tags. The heuristic rule deriver module 420 derives 17 heuristic parameters that are useful in classifying PPTs. The store shelf image acquisition system 2 acquires shelf images for promotional price tag detection

TABLE 2

| Category | Parameters | Purpose |
| --- | --- | --- |
| Promotional price tag | relative location = (−189, −132), relative size = (2.752, 1.755) | Crop out sub-image where the PPT may be based on the detected barcode location and width. All remaining processing will be limited to this sub-image (search is simplified) |
| Color Patch | hue R/(R + G + B), G/(R + G + B) is within 0.1 of 3 possible colors | Detect potential color patches that are similar to the hue of one of the three patches |
| Color Patch | hue R/(R + G + B), G/(R + G + B) is NOT within 0.1 of neutral (1/3, 1/3) | Detect non-neutral color patches that could be part of PPT (complementary rule of above) |
| Color Patch | relative location is blow the below the barcode | Detect potential color patches that are located below the location of the barcode |
| Color Patch | relative size is with 50% error of expected size | Detect potential color patches that are about the expected size |
| Color Patch | color patch fraction is 0.5 or more | Detect potential color patches that has sufficient fraction of color pixel expected (expected value is 0.73~0.78) |
| Number | relative location = (182, 25), relative size = (0.855, 0.858) | Crop out a sub-image within the PPT sub-image that contains the number set (price) |
| Number | 3-digit or more relative character height = (0.395 0.189 0.186) ± 0.1 | Check if the price number block makes sense |
| Text | relative location = (493, 51), relative size = (0.180, 0.681) | Crop out a sub-image within the PPT sub-image that contains the text set |
| Text | 6-characters or more relative character height = 0.1 ± 0.05 | Check if the text block makes sense |

Barcode Localization and Recognition Modules 10 [On-Line Process]

This module analyzes full or portions of acquired non-stitched images to localize and recognize barcodes. According to an exemplary method, the module performs as disclosed in U.S. Patent Publication No. 2014/0363625, published Dec. 17, 2015, by Wencheng Wu et al., and entitled "IMAGE PROCESSING METHODS AND SYSTEMS FOR BARCODE AND/OR PRODUCT LABEL RECOGNITION". It is important to note that barcode localization and recognition is performed on the original non-stitched images from each camera rather than on stitched images since there are risks of resolution loss in the stitching process, which would inevitably reduce the recognition rate of barcodes if this module is run on the stitched images.

Promotional Price Tag Detection Module 12 [On-Line Process]

This module performs promotional price tag detection on stitched images based on the method and system disclosed in U.S. patent application Ser. No. 14/637,830, filed Mar. 4, 2015, by Wu et al., and entitled "SYSTEM AND METHOD FOR RETAIL STORE PROMOTIONAL PRICE TAG DETECTION VIA HEURISTIC CLASSIFIERS" and the heuristic rules generated in the rule generation module described.

Figure 13:
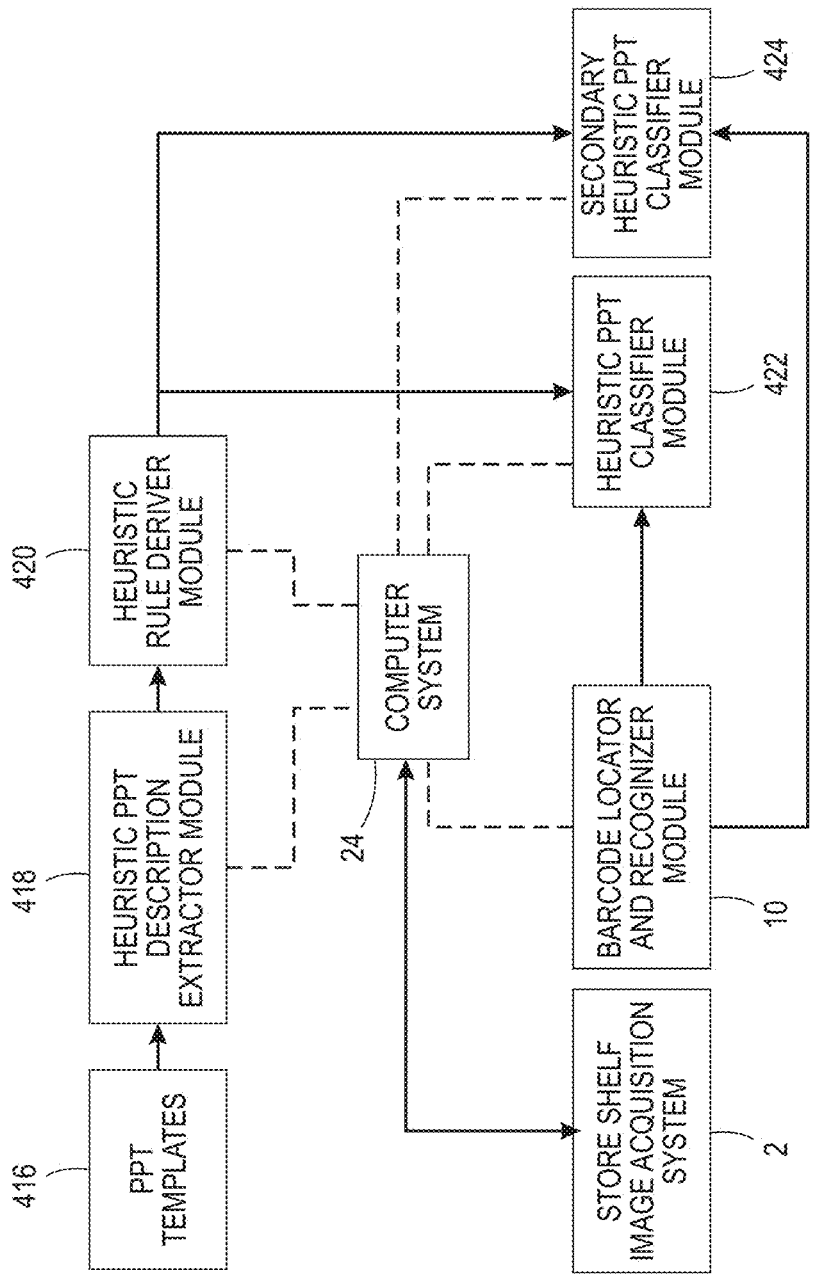
FIG. 13 is a functional block diagram of a retail store PPT detection and classifier according to an exemplary embodiment of this disclosure.
Figure 14:
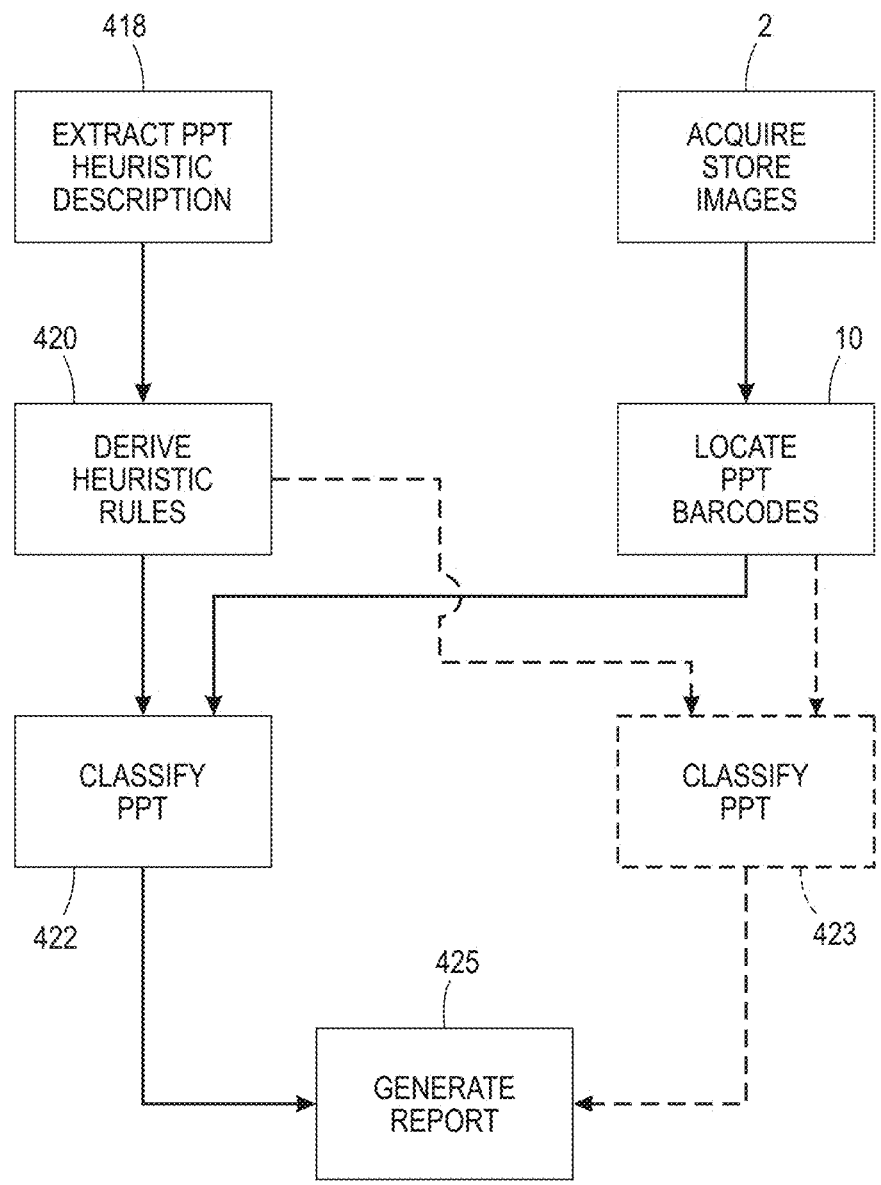
FIG. 14 is a flow chart of a method of retail store PPT detection and classification according to an exemplary embodiment of this disclosure.

FIG. 13 is a functional block diagram of a retail store PPT detection and classifier according to an exemplary embodiment of this disclosure. FIG. 14 is a flow chart of a method of retail store PPT detection and classification according to an exemplary embodiment of this disclosure. As shown, the system includes a store shelf image acquisition system 2, a computer system 24, a barcode locator and recognizer module 10, a heuristic promotional price tag description extractor module 418, a heuristic rule deriver module 420 and a heuristic promotional price tag classifier module 422.

and maintenance, and may also acquire shelf images for barcode localization and recognition. The barcode locator and recognizer module 10 analyzes full acquired images or portions of acquired images to locate and recognize barcodes. The heuristic promotional price tag classifier module 422 extracts heuristic attributes from portions of the acquired images and classifies whether a localized and/or recognized barcode is part of a promotional price tag based on the set of promotional price tag parameters supplied by the heuristic rule deriver module 420. The PPTs identified by the heuristic promotional price tag classifier module 422 may then be compiled in a database and/or compared to a database of PPTs that are supposed to be present within the store. A report 425 is generated listing missing or out-of-date PPTs and their locations. The out-of-date PPTs are removed and the missing PPTs replaced.

The system may also include a secondary heuristic promotional price tag classifier module 424, which classifies whether a localized and/or recognized barcode is part of a promotional price tag based on a subset of the classification task of the primary classifier 422 or an alternative set of heuristic rules for the classification task for predefined imaging condition/area. It should be appreciated that although the secondary heuristic promotional price tag classifier module 424 would provide results faster than heuristic promotional price tag classifier module 422, the results should have a lower confidence level.

The store shelf image acquisition system 2 acquires product shelf images, which are further analyzed for barcode localization and recognition and for promotional price tag detection. The store shelf imager captures images with the image capture assembly at a sequence of locations within the store. The mobile base serves to transport the image capture assembly around the store and may be fully-autonomous or semi-autonomous.

The heuristic promotional price tag description extractor module 418 extracts heuristic descriptions of PPTs, which can later be used to derive heuristic rules and parameters for detecting PPTs. Generally, many different heuristic descriptions can be extracted from an image. with different human operators extracting different attributes. The heuristic promotional price tag description extractor module 418 removes the variations produced by this human factor, to yield a more predictable and relevant attributes without the need of skilled operators, by utilizing pre-categorized image elements of possible PPTs. A graphical user interface (GUI) is used to facilitate the use of unskilled operators. The GUI displays an example of a promotional price tag (PPT) to guide unskilled operators selecting pre-categorized attributes. Optionally, the GUI may also display a regular price tag alongside the PPT to provide guidance of what are good "differentiating" attributes that should be selected. Alternatively, the GUI can include defined attributes for both regular price tags and PPTs and then automatically select "differentiating" attributes based on image analyses.

Figure 15A:
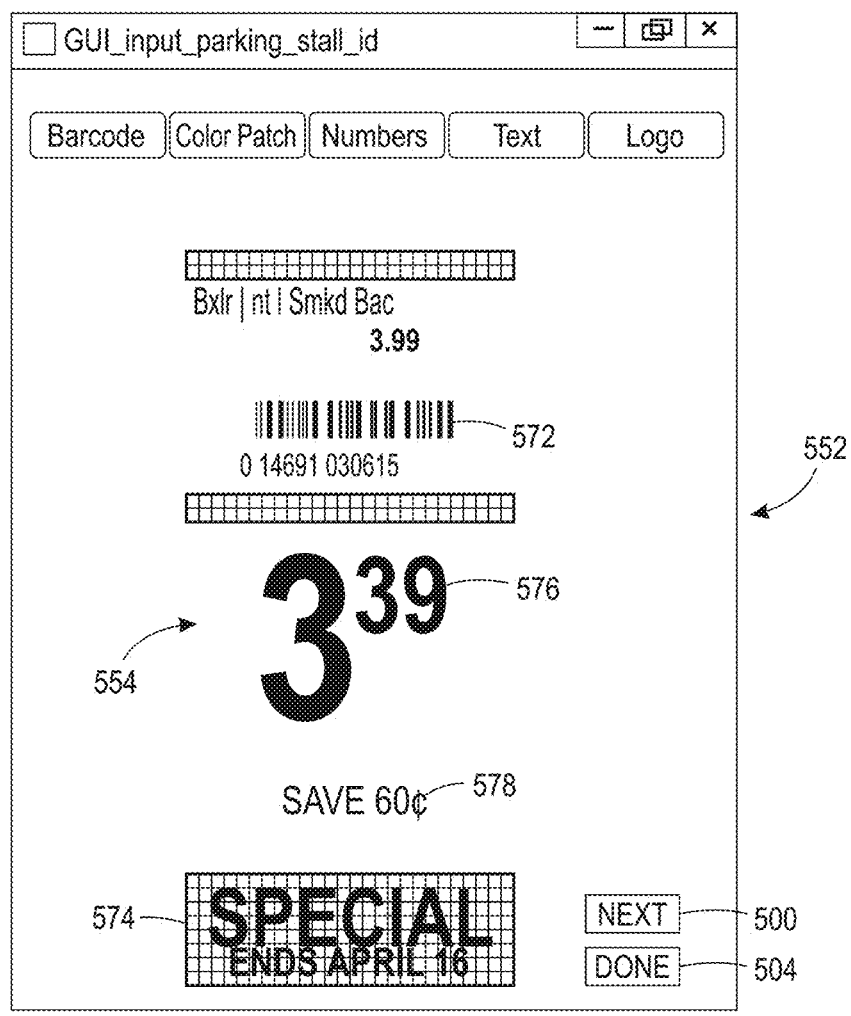
FIG. 15A is a graphical user interface (GUI) for PPT detection and classification according to an exemplary embodiment of this disclosure.
Figure 15B:
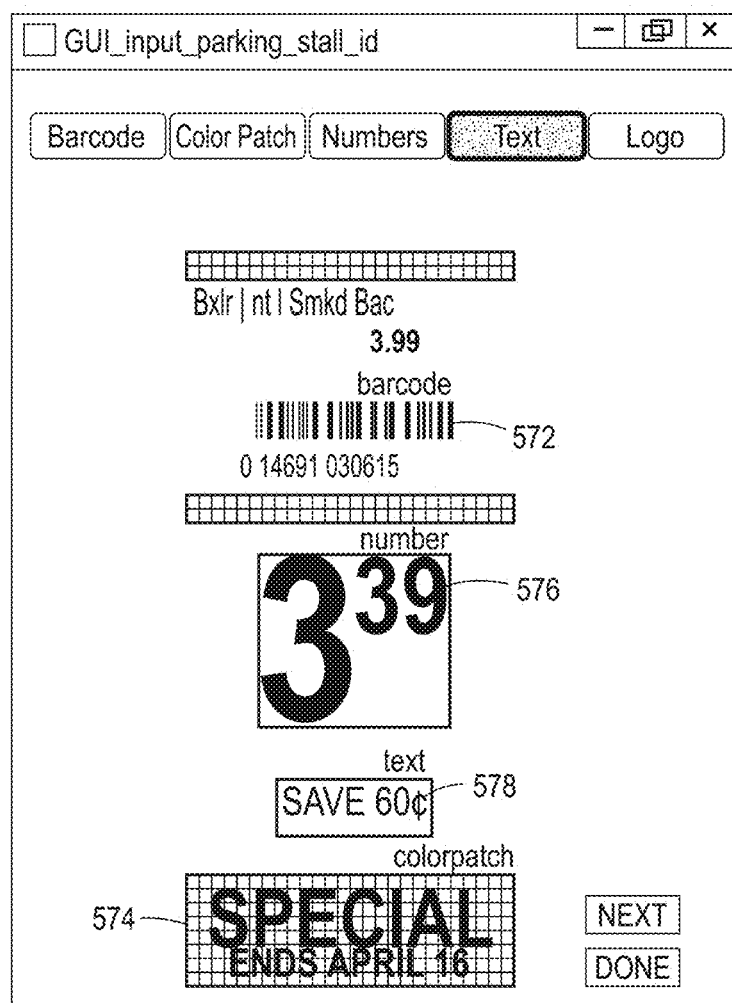
FIG. 15B illustrates an example of PPT elements selected by a user of the GUI shown in FIG. 15A.
Figure 16:
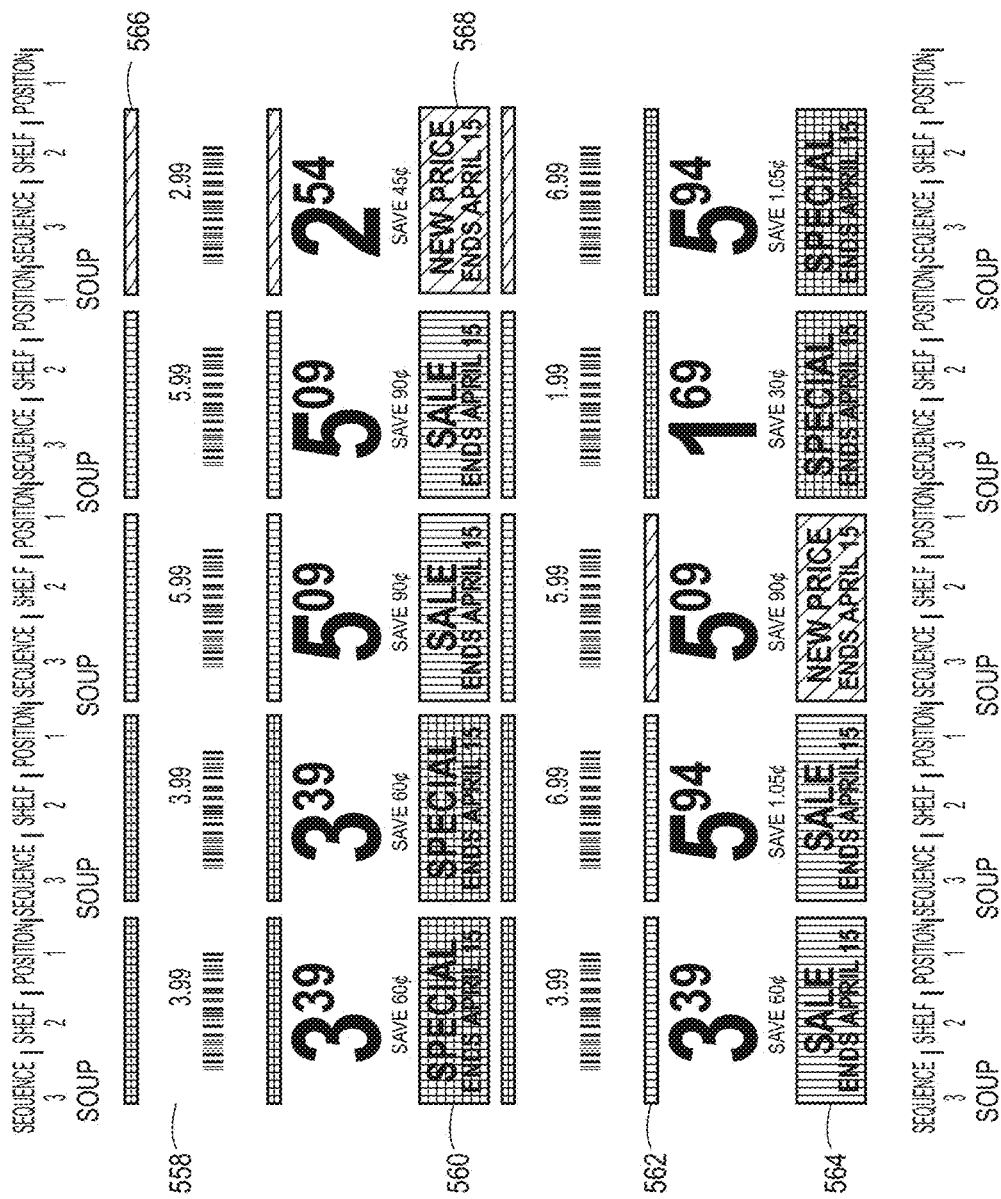
FIG. 16 are examples of PPTs according to an exemplary embodiment of this disclosure.

FIG. 15A is a graphical user interface (GUI) for PPT detection and classification according to an exemplary embodiment of this disclosure. FIG. 15B illustrates an example of PPT elements selected by a user of the GUI shown in FIG. 15A. FIG. 16 are examples of PPTs according to an exemplary embodiment of this disclosure. With reference to FIGS. 15A, 15B and 16, the heuristic promotional price tag description extractor module starts by displaying a set of example PPTs for a given store (chain). PPT heuristic parameters/elements are hereby defined to be elements of a PPT that are observable by the human eye and a heuristic description for a PPT template 416 is defined by the PPT heuristic parameters that are common to a group of exemplar PPTs. In the example shown in FIGS. 15A and 15B, the PPTs include a barcode 572, a color patch 574, a number 576 and text 578. While the PPTs shown in FIG. 16 also include all of these heuristic parameters, it is clear that there are three possible high-level PPT templates for that store whose spatial layout are the same: 1) special items 558 and patch 560; 2) sale items 562 and patch 564; and 3) new price items 566 and patch 568. Accordingly, the PPT heuristic description could be limited by specifying a specific color for the color patch or expanded by specifying the presence of any color patch.

The module prompts the operator to select a PPT such that the selected element is displayed in the GUI as shown in FIG. 15A. In the example of FIG. 15A, image elements are pre-categorized into five categories: barcode 572, color patch 574, number 576, text 578, and logo (not shown).

EXPERIMENTAL RESULTS

A version of this system was implemented incorporating in MATLAB all modules. For testing, 600 PPTs were generated (200 for each PPT shown in FIGS. 6A and 6B, each with a unique barcode. The PPTs were about 3"~4" wide and 3"~4" tall. The product names, product description, prices, and discounts were randomly pulled texts from a web-downloaded dictionary and randomly pulled numbers from random number generator. Due to the limitation of the size of the experimental retail store set-up (6 ft tall, 15 ft wide), 50 PPTs were randomly placed on the shelf for each run to provide an appropriate mix of regular price tag and PPTs. Hence the entire experiment had a total of 12 runs with the robot traveling down the aisle and capturing images for PPT detection.

The robot traveled at a speed of 60 mm/s and took pictures roughly every 12 inches. With the imager used, this yields roughly a 6" overlap horizontally (3" on each side). In the vertical direction, there is only a 1" overlap between imagers. Since the PPTs are 3"~4" wide and 3"~4" tall, it is expected that the horizontal overlap is sufficient to solve most horizontal cut-off issues. After the images were captured, the PPT detection is executed. The results are shown in Table 3 below. Note that although there are 600 PPTs on the shelf, only 580 barcodes are detected (96.67%). This is due to the barcode recognition rate of the system used for the experiment and is attributable, in part, to the images being captured while the robot is moving, where sometimes the barcode is not at the focal plane of the imager.

TABLE 3

|  | PPT | Regular |
| --- | --- | --- |
| PPT | 99.31% (576/580) | 0.69% (4/580) |
| Regular | 0.02% (1/4705) | 99.98% (4704/4705) |
|  | (b) |  |

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A retail store promotional price tag (PPT) detection and classification system comprising:
    a store shelf image acquisition module configured to acquire images of a plurality of product display units located in a retail store, the plurality of product display units including a plurality of products arranged on one or more of the product display fixtures, and a plurality of PPTs attached to the product display fixtures, each PPT including one or more printed colors and product-related data including a barcode associated with a respective product proximately located on the product display fixture near the PPT;
    a device characterization module configured to generate one or more color profiles associated with transforming a plurality of colors associated with the acquired image of the printed PPTs from an image acquisition color space to an original color space associated with a digital representation of the PPTs;
    a PPT detection and classifier module configured to extract one or more heuristic attributes including color from the acquired images using the one or more color profiles and apply one or more predefined heuristic rules to the heuristic attributes to detect and classify each PPT detected in the acquired images as one of a plurality of PPT types;
    a mobile base including an operatively associated navigation component configured to determine a location of the mobile base within the retail store;
    an image capture assembly mounted on the mobile base, the assembly including a plurality of image capture devices for acquiring the images of the plurality of product display units; and
    a master control unit configured to execute control unit instructions for processing the images of the plurality of product display units at a sequence of locations during a movement of the mobile base in the retail store and thereafter generating a store profile indicating locations of the products and/or PPTs throughout the retail store.

2. The retail store PPT detection and classification system according to claim 1, wherein the color profiles are sparse color profiles.

3. The retail store PPT detection and classification system according to claim 1, wherein the color profiles include characterizing a color transformation associated with one or more of a PPT digital template to a printing device, a printed PPT to an image capture device, and a scanner to an image capture device.

4. The retail store PPT detection and classification system according to claim 1, further comprising:
    a heuristic rule generation module configured to generate the predefined PPT detection and classification rules and attributes based on a plurality of PPT templates.

5. The retail store PPT detection and classification system according to claim 1, further comprising:
    a barcode localization and recognition module configured to localize and recognize the barcodes associated with each of the plurality of PPTs.

6. The retail store PPT detection and classification system according to claim 1, wherein the plurality of image capture devices are vertically spaced and the master control unit translates vertically spaced acquired images based on a computed spatial profile of each of the image capture devices.

7. The retail store PPT detection and classification system according to claim 1, wherein the master control unit generates a packaging order and/or printing order for a set of replacement PPTs based on the generated store profile.

8. The retail store PPT detection and classification system according to claim 1, wherein the mobile base acquires the images of the plurality of product display units during one of a continuous movement mode of the mobile base, and a stop and go movement mode of the mobile base.

9. The retail store PPT detection and classification system according to claim 1, wherein the product display units include one or more of vertically spaced shelves and peg boards.

10. A retail store promotional price tag (PPT) detection and classification system comprising:
    a store shelf image acquisition model configured to acquire images from a plurality of image capture devices of a plurality of product display units located in a retail store, the plurality of product display units including a plurality of products arranged on one or more of the product display fixtures, and a plurality of printed PPTs attached to the product display fixtures, each PPT including product-related data including a barcode associated with a respective product proximately located on the product display fixture near the PPT;

a device characterization module configured to generate one or more spatial profiles associated with transforming the acquired images to compensate for distortions associated with each image capture device and alignment of the acquired images;

an image stitching module configured to access the one or more spatial profiles and stitch the acquired images to generate a panorama image;

a PPT detection and classifier module configured to extract one or more heuristic attributes from the panorama image and apply one or more predefined heuristic rules to the heuristic attributes to detect and classify each PPT detected as one of a plurality of PPT types;

a mobile base including an operatively associated navigation component configured to determine a location of the mobile base within the retail store;

an image capture assembly mounted on the mobile base, the assembly including the plurality of image capture devices for acquiring the images of the plurality of product display units; and a master control unit configured to execute control unit instructions for processing the images of the plurality of product display units at a sequence of locations during a movement of the mobile base in the retail store and thereafter generating a store profile indicating locations of the products and/or PPTs throughout the retail store.

11. The retail store PPT detection and classification system according to claim 10, further comprising:
a heuristic rule generation module configured to generate the predefined heuristic rules and associated heuristic attributes based on a plurality of PPT templates.

12. The retail store PPT detection and classification system according to claim 10, further comprising:
a barcode localization and recognition module configured to localize and recognize the barcodes associated with each of the plurality of PPTs.

13. The retail store PPT detection and classification system according to claim 10, wherein the plurality of image capture devices are vertically spaced and the master control unit translates vertically spaced acquired images based on the one or more spatial profiles.

14. The retail store PPT detection and classification system according to claim 10, wherein the master control unit generates a packaging order and/or printing order for a set of replacement PPTs based on the generated store profile.

15. The retail store PPT detection and classification system according to claim 10, wherein the mobile base acquires the images of the plurality of product display units during one of a continuous movement mode of the mobile base, and a stop and go movement mode of the mobile base.

16. The retail store PPT detection and classification system according to claim 10, wherein the product display units include one or more of vertically spaces shelves and peg boards.

17. The retail store profile PPT detection and classification system according to claim 10, wherein the image stitching module is configured to perform model based stitching of the acquired images to generate the panorama image.

18. The retail store profile PPT detection and classification system according to claim 10, wherein the device characterization module is further configured to generate one or more color profiles associated with transforming a plurality of colors associated with the acquired images of the printed PPTs from an image acquisition color space to an original color space associated with a digital representation of the PPTs.

19. A retail store profile generation system comprising:
a mobile base including an operatively associated navigation component configured to determine a location of the mobile base within a retail store, the retail store including a plurality of product display units arranged in a plurality of aisles, each product display unit including a plurality of product display fixtures, a plurality of product arranged on one or more of the product display fixtures, and a plurality of tags attached to the product display fixtures, each tag including product-related data including a barcode associated with a respective product proximately located on the product display fixture near the tag;

an image capture assembly mounted on the mobile base, the assembly including a plurality of vertically spaced image capture devices for acquiring images of the product display units;

a master control unit including an operatively associated memory which stores instructions and a processor for executing the instructions, the control unit instructions including instructions for processing the images acquired by the plurality of image capture devices at a sequence of locations during a movement of the mobile base in the store, thereafter extracting the product-related data from the images of the product display units and generating a store profile indicating locations of the products and/or tags throughout the store based on the extracted product-related data, a spatial characterization of the image capture assembly, a color characterization associated with transforming a plurality of colors associated with the acquired images from an image acquisition color space to an original color space associated with a digital representation of the tags, and the locations of the mobile base at the sequence of locations provided by the navigation component during an interval of time that the images were acquired.

20. The retail store profile generation system according to claim 19, wherein the master control unit is configured to generate a model-based stitched panorama image based on the spatial characterization including a total vertical height associated with a portion of a product display unit, and detect and classify detected tags from the panorama image based on one or more extracted heuristic attributes including color processed according to the color characterization and applying one or more predefined heuristic rules to the heuristic attributes.

21. The retail store profile generation system according to claim 20, wherein the plurality of tags are promotional price tags.

* * * * *